(12) United States Patent
Hesse et al.

(10) Patent No.: US 8,517,717 B2
(45) Date of Patent: Aug. 27, 2013

(54) DETONATION SAFETY IN MICROCHANNELS

(75) Inventors: David J. Hesse, Columbus, OH (US); Kai Jarosch, Bexley, OH (US)

(73) Assignee: Velocys, Inc., Plain City, OH (US)

( * ) Notice: Subject to any disclaimer, the term of this patent is extended or adjusted under 35 U.S.C. 154(b) by 1282 days.

(21) Appl. No.: 10/917,836

(22) Filed: Aug. 13, 2004

(65) Prior Publication Data

US 2006/0035182 A1   Feb. 16, 2006

(51) Int. Cl.
 F23D 3/40   (2006.01)

(52) U.S. Cl.
 USPC .......... 431/7; 431/17; 431/278; 431/328; 431/354

(58) Field of Classification Search
 USPC .......... 431/7, 326, 328, 346, 17, 278, 354, 431/254
 See application file for complete search history.

(56) References Cited

U.S. PATENT DOCUMENTS

| | | | | |
|---|---|---|---|---|
| 1,215,229 A | * | 2/1917 | Willson | 239/552 |
| 1,227,277 A | * | 5/1917 | Land | 431/179 |
| 1,301,044 A | * | 4/1919 | Dunham | 431/12 |
| 1,965,770 A | * | 7/1934 | Burgin | 585/540 |
| 1,965,771 A | * | 7/1934 | Groll et al. | 585/540 |
| 2,194,208 A | * | 3/1940 | Moran | 431/328 |
| 2,511,380 A | * | 6/1950 | Stadler | 239/490 |
| 2,655,786 A | * | 10/1953 | Carr | 60/206 |
| 2,775,294 A | * | 12/1956 | Schwank et al. | 431/328 |
| 3,161,227 A | * | 12/1964 | Goss et al. | 431/328 |
| 3,245,458 A | * | 4/1966 | Patrick et al. | 431/210 |
| 3,277,948 A | * | 10/1966 | Best | 431/328 |
| 3,321,001 A | * | 5/1967 | Vezzoli | 431/22 |
| 3,324,924 A | * | 6/1967 | Hailstone et al. | 431/328 |

(Continued)

FOREIGN PATENT DOCUMENTS

| DE | 196 15 090 | * | 10/1997 |
|---|---|---|---|
| JP | 60073208 A | * | 4/1985 |

(Continued)

OTHER PUBLICATIONS

R. Hajossy and I Morva, Sep. 25, 1997, Measign cience Technology 9(1998) 100-108, PII: So957-0233(98)81522-1, pp. IOP Publishing Ltd., "The Optimum experimental design for reconstruction of flame-front propagation in Long Pipe".*

(Continued)

Primary Examiner — Avinash Savani
(74) Attorney, Agent, or Firm — Frank Rosenberg

(57) ABSTRACT

The proper sizing of microchannel dimensions and the management of internal features offer the possibility of inherently safe operation within the flammable limits of a combustible fluid stream while preserving the largest-possible flow dimensions for industrial-scale process capacity. Specifically, the microchannel dimensions need not be restricted to gap distances below the quenching distance to be operated safely. Microchannel performance can be engineered to provide adequate heat transfer for flame propagation. However, it is essential to maintain flame characteristics in such a manner that it cannot transition to a detonation flame front. A detonation takes place when the combustion wave propagates at supersonic speeds at the existing local temperature and pressure conditions in the system. It results in a much larger energy release over a much smaller period of time as compared to a laminar flame or deflagration, the later of which is a combustion wave propagating at subsonic speed. Detonations can be potentially highly destructive and very hazardous and therefore should be avoided for most industrial applications.

21 Claims, 15 Drawing Sheets

(56) References Cited

U.S. PATENT DOCUMENTS

| | | | |
|---|---|---|---|
| 3,330,326 A * | 7/1967 | Shinpei et al. | 431/347 |
| 3,558,252 A * | 1/1971 | Roca | 431/328 |
| 3,635,644 A * | 1/1972 | Reid, Jr. | 431/9 |
| 3,727,409 A * | 4/1973 | Kelley et al. | 60/768 |
| 3,738,793 A * | 6/1973 | Reid et al. | 431/328 |
| 3,777,717 A * | 12/1973 | Mach et al. | 122/156 |
| 3,870,455 A * | 3/1975 | Hindin | 431/7 |
| 3,885,907 A * | 5/1975 | Teague, Jr. | 431/328 |
| 3,923,447 A * | 12/1975 | Desty et al. | 431/326 |
| 4,104,018 A * | 8/1978 | McKay | 432/29 |
| 4,444,109 A * | 4/1984 | Gifford, Jr. | 102/200 |
| 4,643,667 A * | 2/1987 | Fleming | 431/7 |
| 4,865,820 A * | 9/1989 | Dunster et al. | 422/220 |
| 4,870,824 A * | 10/1989 | Young et al. | 60/723 |
| 4,900,244 A * | 2/1990 | Keller et al. | 431/5 |
| 4,911,143 A | 3/1990 | Pivot et al. | 126/414 |
| 5,104,309 A * | 4/1992 | Krieger | 431/7 |
| 5,249,953 A * | 10/1993 | Roth | 431/7 |
| 5,251,609 A | 10/1993 | Thibault et al. | 126/39 |
| 5,262,206 A * | 11/1993 | Rangaswamy et al. | 427/447 |
| 5,407,348 A * | 4/1995 | Mims et al. | 431/346 |
| 5,464,006 A * | 11/1995 | Ledjeff et al. | 122/14.1 |
| 5,474,441 A * | 12/1995 | Farrauto et al. | 431/7 |
| 5,547,372 A * | 8/1996 | Smith | 431/328 |
| 5,575,636 A * | 11/1996 | Kobayashi et al. | 431/8 |
| 5,628,181 A * | 5/1997 | Kraemer | 60/39.11 |
| 5,685,708 A * | 11/1997 | Palmer-Jones | 431/328 |
| 5,842,851 A * | 12/1998 | Pivot | 431/328 |
| 5,964,086 A * | 10/1999 | Kraemer | 60/776 |
| 6,488,838 B1 * | 12/2002 | Tonkovich et al. | 208/108 |
| 2002/0102762 A1 | 8/2002 | Huang et al. | 438/49 |
| 2005/0265915 A1 * | 12/2005 | Tonkovich et al. | 423/584 |

FOREIGN PATENT DOCUMENTS

| | | | |
|---|---|---|---|
| JP | 62-162821 | * | 7/1987 |
| WO | WO 99/00186 | | 6/1998 |
| WO | WO 2005/060658 A1 | | 7/2005 |
| WO | WO 2005/105665 A2 | | 11/2005 |

OTHER PUBLICATIONS

M. Groeth et al pp. 1-12, Poulter Laboratory, SRI International, "Large Scale Hydrogen Deflagrations and Detonations".*

S.P. Medvedev, H. Oliver, Institute of Chemical Physics, RAS, Moscow, Russia, SWL Strosswellenlabbor RWTH EXPRO, Deliverable Report D12 Conttract EVG1-CT-2001-00042, WP1.3—Tartner 2, "Improvements in Justifcation Basis for Combustion Criteria", Apr. 2004, pp. 1-14.*

Matthew W. Losey et al, Journal of Microelectricmechanical Systems, vol. 11, No. 6, Dec. 2002, "Design and Fabrication of Microfluidic Devices for Multiphase Mixing and Reaction", pp. 709-717.*

Michael T. Janicke et al, Journal of Catalysis 191, 282-293 (2000)"The Control and Oxidation of Hydrogen from an Explosive Mixture of Gases Using a Microstructured Reactor/Heat Exchanger and Pt/Al2O3 Catalyst".*

Katsuki Kusakabe et al, "Development of Microcatalytic Reactor System", Korean Journal of Chemal Engineering, 18(3), 271-276 (2001).*

Kees van Wingerden et al, Christian Michelsen Research Bergen, Norway, pp. total 15, Detonation in Pipes and in the Open, Nov. 1999 (http://www.safetynet.de/Seiten/articles/CMRNov99.pdf).*

"The Controlled Oxidation of Hydrogen from an Explosive Mixture of Gases Using a Microstructured Reactor/Heat Exchanger and Pt/Al2O3 Catalyst" Janicke et al., J. Catal., 191, 282-293 (2000).

"A Microstructure Reactor System for the Controlled Oxidation of Hydrogen for possible Application in Space," Haas-Santo et al., IMRET 5, 313-321 (2002).

"Synthesis of ethylene oxide in a microreaction system," Kestenbaum et al., IMRET 3, 207-212 (2000).

PCT International Search Report, mailed Jan. 2, 2007.

Communication /examination report in EP application 05 857 903.8, mailed Jan. 20, 2010.

* cited by examiner

DETONATION SAFETY IN MICROCHANNELS

FIELD OF THE INVENTION

This invention relates to conducting oxidation (including combustion) reactions in microchannel reactors.

BACKGROUND OF THE INVENTION

Many chemical processes involve the reaction of a combustible material with an oxidant. Within proper design constraints and operating conditions, these reactions can take place safely. However, if there is an upset in one or more of the operating conditions or a misapplication of the process, it is possible that the materials within the process can be within explosive or detonable concentration limits.

Microchannel reactors have the ability to handle gas mixtures that could detonate in conventional apparatus. In order to safely handle these mixtures, the common understanding has been to use very small diameter microchannels that are below the quench gap for the selected, potentially explosive, gas mixture. Hagendorf et al. recommend limiting the total reactor volume to approximately 1 cm$^3$ to avoid the potential for detonation. See Hagendorf, U., M. Janicke, and F. Schüth, 1998, "A Pt/Al$_2$O$_3$ Coated Microstructured Reactor/Heat Exchanger for the Controlled H$_2$/O$_2$-Reaction in the Explosion Regime," Process Miniaturization: 2$^{nd}$ International Conference on Microreaction Technology, New Orleans, La. March 9-12, published by the American Institute of Chemical Engineers, New York, N.Y. Other workers have explained that flammable gas mixtures such as ethylene and oxygen should be handled safely by requiring that the channel gap be less than the quench distance (also referred to as quench gap in this invention). See Kestenbaum, H., Al Lange de Oliveira, W. Schmidt, F. Schüth, W. Ehrfeld, K. Gebauer, H. Löwe, Th. Richter, 2000, "Sythesis of ethylene oxide in a microreaction system," Microreaction Technology: Industrial Prospectus, IMRET 3: Proceedings of the Third International Conference on Microreaction Technology, W. Ehrfeld (Ed.), Springer-Verlag; Haas-Santo, K., O. Görke, K. Schubert, J. Fiedler, and H. Funke, 2001, "A Microstructure Reactor System for the Controlled Oxidation of Hydrogen for possible Application in Space," Microreaction Technology, IMRET 5: Proceedings of the Third International Conference on Microreaction Technology, W. Matlosz et al. (Eds.), Springer-Verlag.

INTRODUCTION

The manner in which detonation transition is eliminated depends upon the overall goals of the production facility. The high surface to volume ratio of each channel, which promotes a higher rate of intermediate radical quenching on the walls, can serve to inherently suppress or partially quench a flame. The mitigating influences of heat transfer and free radical quenching, while clearly present from a phenomenological understanding of the process, is difficult to quantify in a general context. This invention makes it possible to ensure safety from a detonation standpoint on a general basis from a geometrical configuration of the microchannel application.

SUMMARY OF THE INVENTION

The invention provides a method of safely conducting a potentially explosive reaction, comprising: flowing a detonable gas mixture through a microchannel; and conducting a reaction with the gas mixture contained in the microchannel. In this method, the microchannel containing the detonable gas mixture has a size greater than the quench gap. The method further comprises a safening characteristic comprising at least one of:
1. Limiting the channel gap to a critical value known as the detonation cell size, $\lambda$;
2. Allowing the channel gap to exceed $\lambda$ but limiting the channel length to a critical value known as the detonation run-up length, $L^*$; or
3. Ensuring the combustion flame speed remains in the laminar regime if possible or maintaining flame speed below Mach 1.0.

Each of these safening characteristics is discussed in the Detailed Description section below. While the detailed description sometimes describes particular gas compositions; it should be understood that the invention applies generally to combustible gas mixtures.

In a related aspect, the invention provides a chemical system, comprising: a microchannel reactor comprising a microchannel containing a detonable gas mixture flowing through the microchannel; wherein the microchannel containing the detonatable gas mixture has a size greater than the quench gap; and further comprising a safening characteristic comprising at least one of: (a) wherein the channel gap detonation cell size is smaller than the cell size required to allow a detonation; or (b) wherein the microchannel has a length less than the detonation run-up length $L^*$; or (c) maintaining flow in the laminar region, transitional region, or turbulent region at a velocity below Mach 1.0, throughout the microchannel.

In summary, if at least one of these conditions is not met: (1) channel gaps exceeding a critical size, (2) channel lengths permitting flame acceleration up to a critical detonation velocity, or (3) turbulent flame propagation at a velocity of at least Mach 1.0, then detonation cannot take place. Therefore, with proper engineering, processes in microchannels can be safely applied in flammable regimes not acceptable in typical macro-scale applications.

GLOSSARY

A "channel" is a flow path contained within a channel wall or walls. Channel length is in the direction of flow through a channel. Unless restricted by design requirements, channels can have any length. In the present invention, channels have at least one dimension that is perpendicular to length that is 10 mm or less.

"Aspect ratio" of a channel is the ratio H/W where H and W represent the height and width of the channel in the cross-sectional plane normal to the length L of the channel and H≦W≦L. Aspect ratio varies between the limit of 0 (channel height negligible compared to its width) to 1 (height equal to width).

"Annular blockage ratio" is the blockage ratio associated with an in-channel feature that blocks flow around the perimeter of a channel. This type of feature has been used to study the effect of flame acceleration on the potential for transition to detonation.

"Blockage ratio" is the fraction of channel cross-sectional area associated with an in-channel feature that does not permit flow or forces flow around itself. It influences the level of flame acceleration and stretching within a channel which in turn impacts the potential for transition to a deflagration or detonation.

"Choked flow" or the choking regime describes the situation when the conditions for flame quenching are not satisfied and the flame continuously accelerates to reach a final steady-state value. When this happens, flame propagation can be considered as a quasi-steady one-dimensional compressible flow in a pipe with friction and heat addition. This regime is referred to as the choking regime, where the combined effects of wall friction and heat addition control the final steady-state flame speed.

A "deflagration" is defined as a combustion wave propagating at subsonic velocity relative to the unburned gas immediately ahead of the flame. Typically deflagration is associated with flame speeds in the range of 1 to 1000 m/s A "detonation" is defined as a combustion wave propagating at supersonic speed (Mach number exceeding 1) relative to the unburned gas immediately ahead of the flame. Typical flame speeds for a deflagration exceed 1000 m/s.

A "detonable gas mixture" is a combustible gas mixture that can ignite, and, in a suitably large space in the presence of a suitable initiator, result in a flame speed exceeding Mach number 1. A "suitable initiator" may include a spark discharge of energy (electrical, thermal, etc.), a flame or gas temperature raised to the auto ignition limit, the presence of a solid catalyst fixed to the channel walls, or catalyst present in solid particulate, liquid droplet, or gas phase that is known for making possible or accelerating the rapid reaction of the gas mixture. A "suitably large space" is a space larger than the detonation cell size but sufficiently small to allow a detonation. In some embodiments a "suitably large space" is a cylinder that is infinitely long (or at least sufficiently long to have no limiting effect on a detonation) and has the diameter $\lambda$ (exactly 3 times the detonation limit as explained below).

"Equivalence ratio" is the molar ratio of fuel to oxidizer divided by the same ratio at stoichiometric conditions.

"Expansion ratio" ($\sigma$) is the ratio of burned gas volume to initial volume for a low-speed (constant pressure) flame.

"Flame acceleration" is the rapid increase in flame speed due to generation of small and large-scale turbulent eddies as flow upstream of the advancing flame passes over objects or through orifices.

A "fuel lean mixture" is a combustible mixture with less than the stoichiometric proportions of fuel (equivalence ratio less than 1).

A "fuel rich mixture" is a combustible mixture with more than the stoichiometric proportions of fuel (equivalence ratio greater than 1).

A "microchannel," for purposes of the present invention, is a channel having a height and/or a width (also called a minimum dimension) of 2 cm or less, and a length (the direction of net flow) that is greater than the height and/or a width. In some preferred embodiments, a microchannel has a minimum dimension of 1 cm or less, and in some embodiments, 0.5 cm or less.

"Quench gap", also referred to as the quenching distance, is the minimum channel gap that will permit sustained flame propagation. Below the quench gap, ignition of a combustible gas mixture will not develop into a flame because the rate of heat transfer out of the channel walls and the rate of destruction of active radical species needed for the combustion reaction exceed the rate of heat generation and radical production within the bulk gas phase. Since quench gap is a function of thermodynamic conditions (e.g., temperature and pressure), gas composition, and channel wall characteristics, it is generally determined experimentally as described in "Standard Test Method for Minimum Ignition Energy and Quenching Distance in Gaseous Mixtures", American Standard for the Testing of Materials (ASTM), Designation: E582-88 (Reapproved 1999), West Conshohocken, Pa., USA.

DETAILED DESCRIPTION OF THE INVENTION

Figure 1:
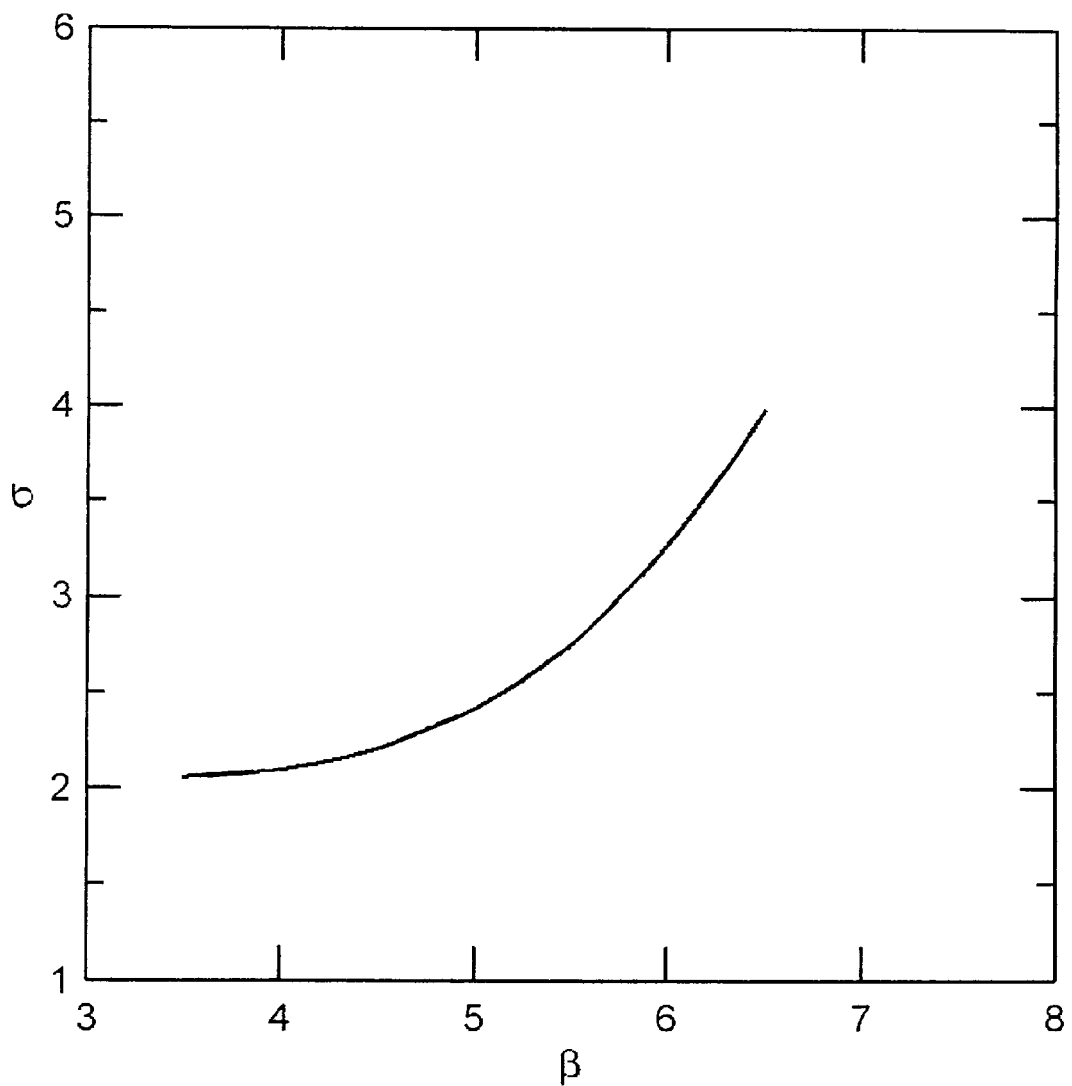
FIG. 1 Resulting combustion regime as a function of expansion ratio $\sigma$ and Zeldovich number $\beta$ for mixtures with $\beta(Le-1)<-2$. Black points represent fast combustion regimes, and gray points represent slow combustion regimes. Groups of points are marked with values of initial temperatures for hydrogen-air-steam mixtures. Reference: Flame Acceleration and Deflagration to Detonation Transition in Nuclear Safety (State-of-the-Art Report by a Group of Experts), OECD Nuclear Energy Agency, NEA/CSNI/R(2000)7, August 2000.

In its broader aspects, the invention includes any detonable gas composition. For example, the gas mixture may include, but is not limited to, of any one of the following fuel, oxidant, and inert (diluent) combinations: hydrogen-oxygen; hydrogen-oxygen-nitrogen; hydrogen-oxygen-steam-nitrogen; hydrogen-air-carbon monoxide; hydrogen-oxygen-carbon dioxide; hydrogen-nitrous oxide-nitrogen; hydrogen-oxygen-argon; hydrogen-oxygen-helium; hydrogen-oxygen-nitrogen-argon; hydrogen-chlorine; hydrogen-oxygen-helium-carbon dioxide; hydrogen oxygen-helium-water; carbon monoxide-oxygen-argon; carbon monoxide-hydrogen-oxygen-argon; carbon monoxide-acetylene-oxygen-nitrogen; carbon monoxide-ethylene-oxygen-nitrogen; carbon monoxide-n-hexane-oxygen-nitrogen; methane-oxygen; methane-oxygen-nitrogen; methane-nitrous oxide-nitrogen; acetylene-oxygen; acetylene-oxygen-argon; acetylene-oxygen-helium; acetylene-oxygen-krypton; acetylene-oxygen-nitrogen; ethylene-oxygen-nitrogen; ethylene-oxygen-argon; ethylene-oxygen-helium; ethane-oxygen-nitrogen; ethane-oxygen-argon; ethane-oxygen-helium; propane-oxygen-nitrogen; propane-oxygen-argon; propane-oxygen-helium; n-butane-oxygen; benzene-hydrogen-oxygen-nitrogen; n-hexane-nitrogen-oxygen; and n-hexane-acetylene-nitrogen-oxygen.

In some preferred embodiments, the detonable gas mixture comprises components in any of the following molar proportions or partial pressures: dihydrogen—at least 5%, 0% to 50%, 10% to 40%, at least 0.5 atm, 0 atm to 50 atm, 1 atm to 20 atm; CO—at least 2%, 0% to 40%, 1% to 20%, at least 0.05 atm, 0 atm to 30 atm, 0.1 atm to 10 atm; methane—at least 5%, 0% to 70%, 10% to 50%, at least 0.5 atm, 0 atm to 50 atm, 1 atm to 50 atm; hydrocarbon (for example, acetylene, ethylene, n-hexane)—at least 3%, 0% to 50%, 10% to 40%, at least 0.5 atm, 0 atm to 50 atm, 1 atm to 20 atm; dioxygen—at least 5%, 0% to 50%, 10% to 40%, at least 0.5 atm, 0 atm to 50 atm, 1 atm to 20 atm; and dinitrogen—at least 5%, 0% to 70%, 10% to 40%, at least 0.5 atm, 0 atm to 50 atm, 1 atm to 20 atm.

Criteria for Establishing Potential for Detonation

The three major types of combustion propagation in a channel are (1) slow flames, (2) fast flames, or (3) detonations. Slow flame combustion generally will not transition to detonation under any circumstance. Fast flames, which will henceforth be termed deflagrations, require flame turbulence and acceleration to reach detonation conditions, otherwise known as deflagration to detonation transition (DDT).

The primary metric for assessing when a deflagration may undergo DDT is through an examination of the degree of product gas expansion. The expansion ratio, a, is the ratio of the densities of reactants to that of the products just upstream and downstream of the flame front, respectively. Flame acceleration (FA) is only possible in mixtures having an expansion ratio exceeding a critical threshold value. The requirement of a sufficiently-large value of a is a necessary but not a sufficient condition for development of fast combustion flame, i.e., for the potential to undergo DDT. To support detonation, the channel gap must exceed the detonation cell size and a sufficiently long flame path and/or geometrical configuration promoting flame folding and stretching needs also to be present in order that the flame can actually accelerate to detonation velocity magnitude. If the flame accelerates to a velocity magnitude equal to or greater than 1.2 times the speed of sound in the combustion products, the conditions for spontaneous formation of detonation can be satisfied.

The critical value for a depends upon the value of the product $\beta(Le-1)$ where $\beta$ and Le are the Zeldovich and Lewis numbers, respectively, defined as follows:

$$\beta = \frac{E_a(T_b - T_u)}{RT_b^2} \text{ and } Le = \frac{\alpha}{D}$$

where
$E_a$=effective activation energy of unreacted mixture,
R=ideal gas constant,
$T_u$=initial reactant temperature before ignition,
$T_b$=maximum flame temperature,
$\alpha$=thermal diffusivity of unreacted mixture,
D=molecular diffusivity of unreacted mixture.

Thus $\beta$ is the ratio of diffusive to reactive length scales whereas Le is the ratio of thermal to molecular diffusivity. Their product is the defining parameter for determining the thermal-diffusion flame instability regime. The stability boundary corresponds to $\beta(Le-1)=-2$. Flames are stable when $\beta(Le-1)>-2$, and unstable when $\beta(Le-1)<-2$. Based on this flame stability criteria, the critical value for $\sigma$ takes on one of two values in the case of a hydrogen/air/steam system:

$\sigma > 3.5$ for $\beta(Le-1) \geq -2$ or $\sigma > \sigma^*(\beta)$ for $\beta(Le-1) < -2$ where the function $\sigma^*(\beta)$ is given by an experimentally obtained curve shown in FIG. 1.

To apply the criteria stated in the above two inequalities, values of $\beta$ and Le are required for the combustible mixture. In the example of hydrogen-air-steam mixtures, hydrogen-lean mixtures are characterized by $\beta(Le-1)<-2$ and hydrogen-rich and stoichiometric mixtures by β(Le−1)>−2. Mixtures close to stoichiometry on the lean side with equivalence ratio from 0.7 to 1.0 (depending on initial temperature and steam concentration) are at the border β(Le−1)=−2 (source: S. B. Dorofeev, M. S. Kuznetsov, V. I. Alekseev, A. A. Efimenko and W. Breitung, "Evaluation of Limits for Effective Flame Acceleration in Hydrogen Mixtures," Preprint IAE-6150/3, RRC "Kurchatov Institute" Report FZKA-6349, Forschungszentrum Karlsruhe, 1999).

Calculation of the Lewis number is straight forward and requires only knowledge of the thermo-physical properties of the mixture. To calculate β, the values of effective activation energy $E_a$ and $T_b$ in addition to $T_u$ are required. Thermodynamic calculations provide data on $T_b$ for each particular mixture (equilibrium temperature of combustion products at constant pressure). Effective activation energy $E_a$ can be estimated from dependence of laminar flame speed on $T_b$. For lean hydrogen-air-steam mixtures, such estimates give an average value of $E_a/R \approx 9800$ K. For fuel rich mixtures, $E_a/R \approx 17700$ K (source: Dorofeev, op. cit.).

Assuming that the flammable mixture satisfies the σ-criteria for detonation, DDT can be suppressed by appropriately managing channel gap, length, or internal features as described below. Beyond establishing whether operating conditions can potentially lead to a DDT or whether it will remain a stable, subsonic flame, the values for β(Le−1) and a can also be used to determine the time required for DDT. This transition time in conjunction with correlations for flame velocity thereby permit an estimate of the maximum allowable length of a channel to prevent DDT (see "Limit Channel Length" below).

The following examples relate mostly to mixtures of hydrogen and oxygen; however, the worker of ordinary skill can, through routine experimentation, follow the exemplified techniques to identify appropriately safe operating conditions for any detonatable mixture.

Example 1

Determine the Combustion Regime of a Hydrogen/Oxygen Mixture

The equivalence ratio is defined as $$\phi = \frac{(F/O)}{(F/O)_{st}}$$

where
(F/O)=the fuel-to-air mass ratio present in the system (dimensionless)
$(F/O)_{st}$=the stoichiometric fuel-to-air mass ratio (dimensionless)
The oxidation of hydrogen under stoichiometric conditions is given by the balanced equation $$H_2 + \frac{1}{2}O_2 \rightarrow H_2O$$

$$\text{Therefore } (F/O)_{st} = \frac{1 \text{ gmole } H_2 \times 2.016 \text{ g } H_2/\text{gmole } H_2}{1 \text{ gmole } O_2 \times 32 \text{ g } O_2/\text{gmole } O_2} \approx \frac{1}{8} = 0.125$$

Figure 2:
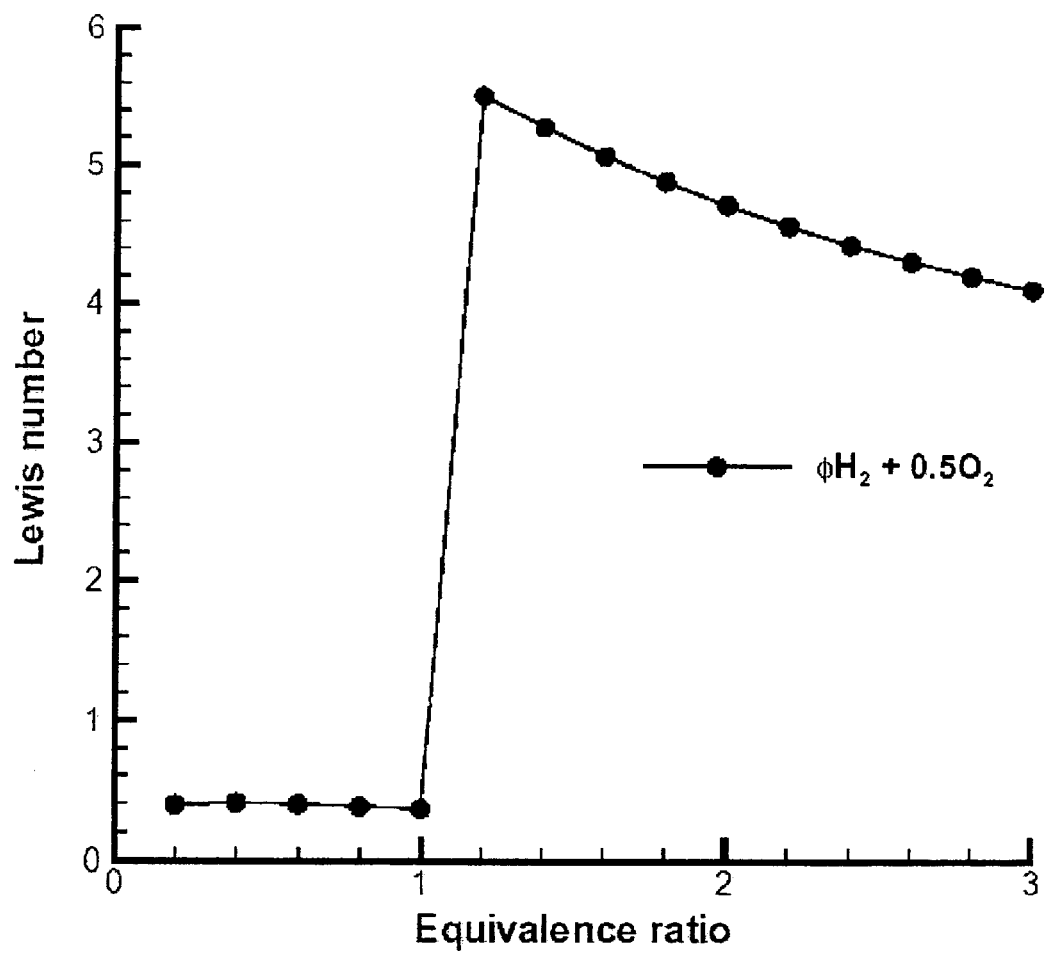
FIG. 2 Lewis Number (Le) versus Equivalence Ratio for Fuel-Oxidant Mixtures. Reference: E. Schultz, E. Wintenberger, J. E. Shepherd, 1999 "Investigation of Deflagration to Detonation Transition for Application to Pulse Detonation Engine Ignition Systems," Proceedings of 16th JANNAF Propulsion Symposium, Cocoa Beach, Fla. Oct. 8, 1999.
Figure 3:
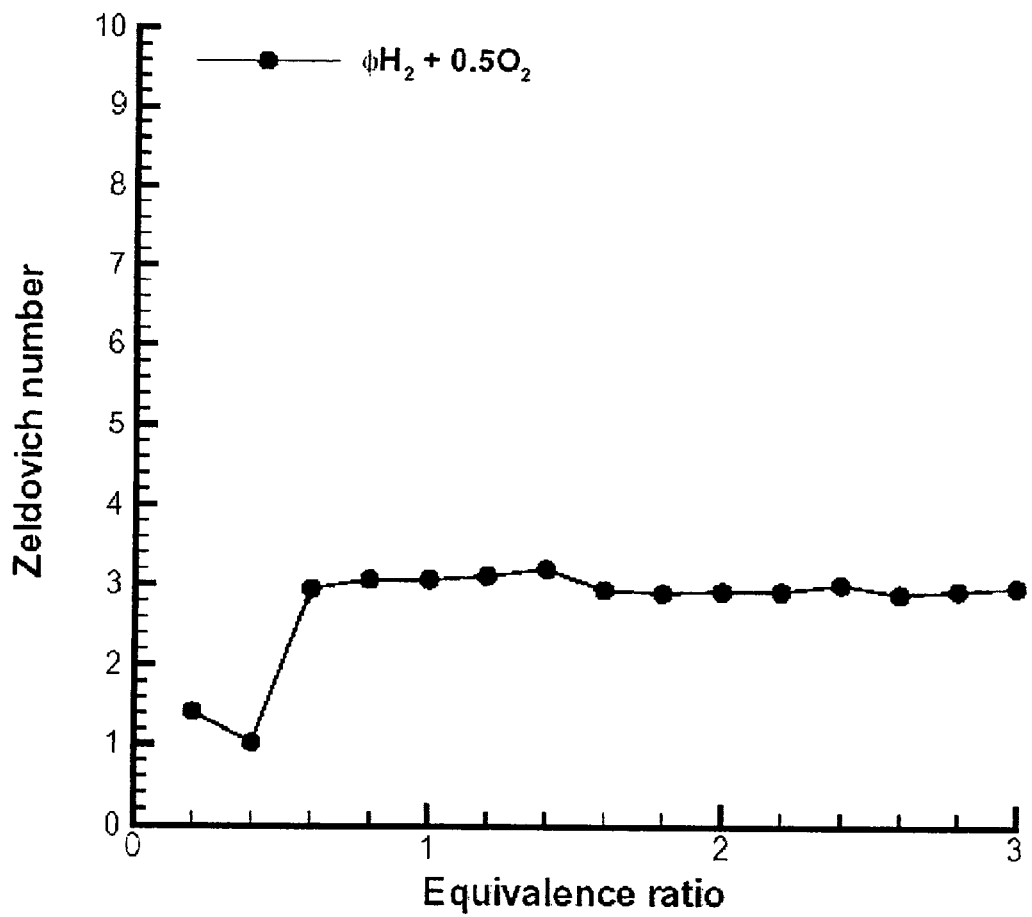
FIG. 3 Zeldovich Number ($\beta$) Versus Equivalence Ratio for Fuel-Oxidant Mixtures. Reference: E. Schultz, E. Wintenberger, J. E. Shepherd, 1999 "Investigation of Deflagration to Detonation Transition for Application to Pulse Detonation Engine Ignition Systems," Proceedings of 16th JANNAF Propulsion Symposium, Cocoa Beach, Fla. Oct. 8, 1999.
Figure 4:
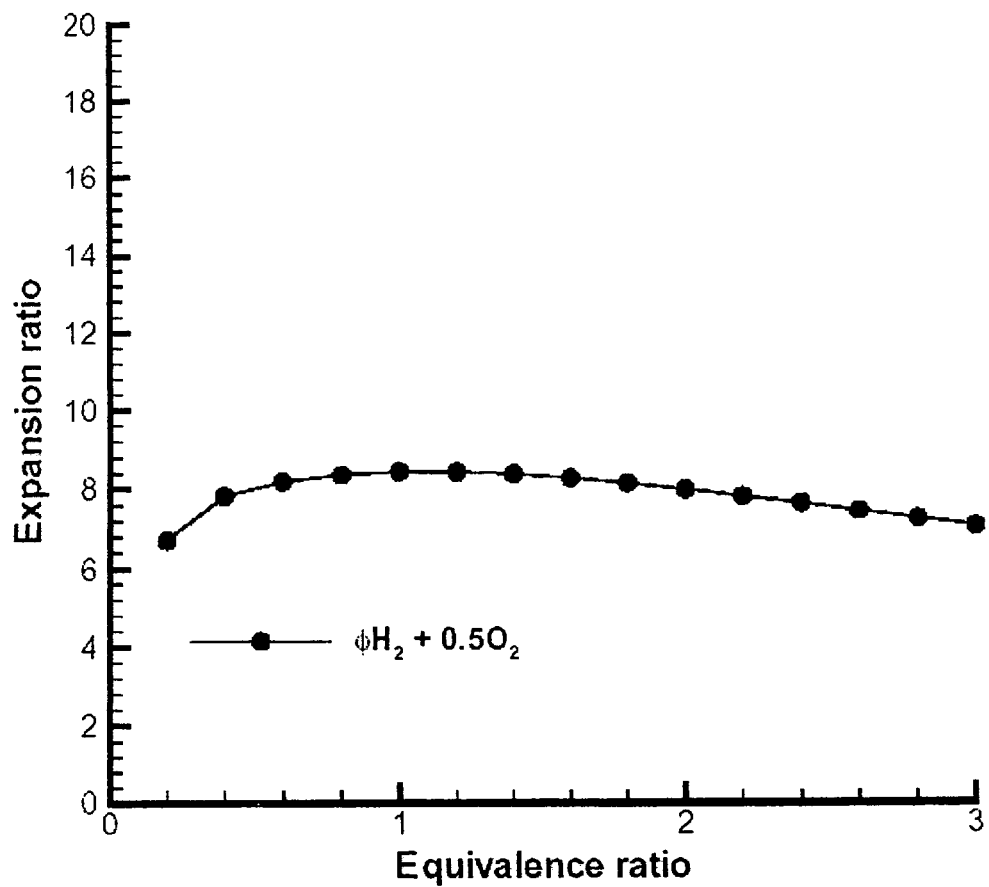
FIG. 4 Expansion Ratio ($\sigma$) Versus Equivalence Ratio for Various Fuel-Oxidant Mixtures. Reference: E. Schultz, E. Wintenberger, J. E. Shepherd, 1999 "Investigation of Deflagration to Detonation Transition for Application to Pulse Detonation Engine Ignition Systems," Proceedings of 16th JANNAF Propulsion Symposium, Cocoa Beach, Fla. Oct. 8, 1999.

Suppose we have a fuel rich mixture with a fuel-oxidant ratio (F/O)=0.2. Then the equivalence ratio φ=0.2/0.125=1.6. Using FIG. 2, the Lewis number evaluates to approximately 5. On the other hand, using FIG. 3, the Zeldovich number β is approximately 3. Therefore β(Le−1)=12>−2 which implies stable flame propagation and therefore we should use the expansion ratio criteria that σ>3.5 is required for possible detonation. Using FIG. 4 at an equivalence ratio of 1.6, we see that σ≈8 which far exceeds the criteria (i.e., the mixture is detonatable). Therefore DDT is possible unless other features in the microchannel design are appropriately controlled.

Limit Channel Gap

The prior art suggests that a microchannel process is safe only when the channel gap is below the safe quenching distance (i.e., the quench gap), which is the maximum allowable distance that ensures suppression of all flame propagation at a specific pressure and temperature condition. As the channel gap increases beyond the safe quenching distance, flame propagation is possible within the flammable limits. For a sufficiently large channel gap and under the necessary composition and thermodynamic conditions, a flame may become a deflagration, defined as a combustion wave propagating at subsonic velocity relative to the unburned gas immediately ahead of the flame with flame speeds in the range of 1 m/s to 1000 m/s. Empirical studies using detonation of hydrogen or hydrocarbon compounds in the presence of oxidants indicate the minimum gap for low aspect ratio channels to support detonation transmission is at least as large as the composition detonation cell size, λ, a quantity that is approximately an order of magnitude greater than the quenching distance. This guidance holds for rectangular channels of all aspect ratios. For right cylindrical tubes, because of the perfect axial symmetry and the reinforcement of the flame front pressure wave that this offers, the critical diameter to prevent detonation is much less than that of rectangular channels, specifically λ/3. A general discussion of the concept of detonation cell size and how it can be determined is described in the following references:

Glassman, I., 1996, *Combustion*, Academic Press, 252-259.
Moen, I. O., 1993, "Transition to detonation in fuel-air explosive clouds," *Journal of Hazardous Materials*, 33, 159-192.
Berman, M., 1986, "A Critical Review of Recent Large-Scale Experiments on Hydrogen-Air Detonations," *Nuclear Science and Engineering*, 93, 321-347.

Table 1 gives some examples of the contrast in sizes between safe quench gap and the detonation cell size, below which a rectangular channel cannot undergo a detonation.

TABLE 1

Quench Gap and Detonation Cell Size for Select Chemicals at Stoichiometric Concentrations in Air and an Initial Pressure and Temperature of 1 atm and 298 K, Respectively.

| Chemical | Quench Gap (mm) | Detonation Cell Size (mm) |
|---|---|---|
| Hydrogen | 0.1 | 5 |
| Ethylene Oxide | 1.0 | 20 |
| Ethane | 1.5 | 54-62 |
| Propane | 1.7 | 69 |

Figure 5:
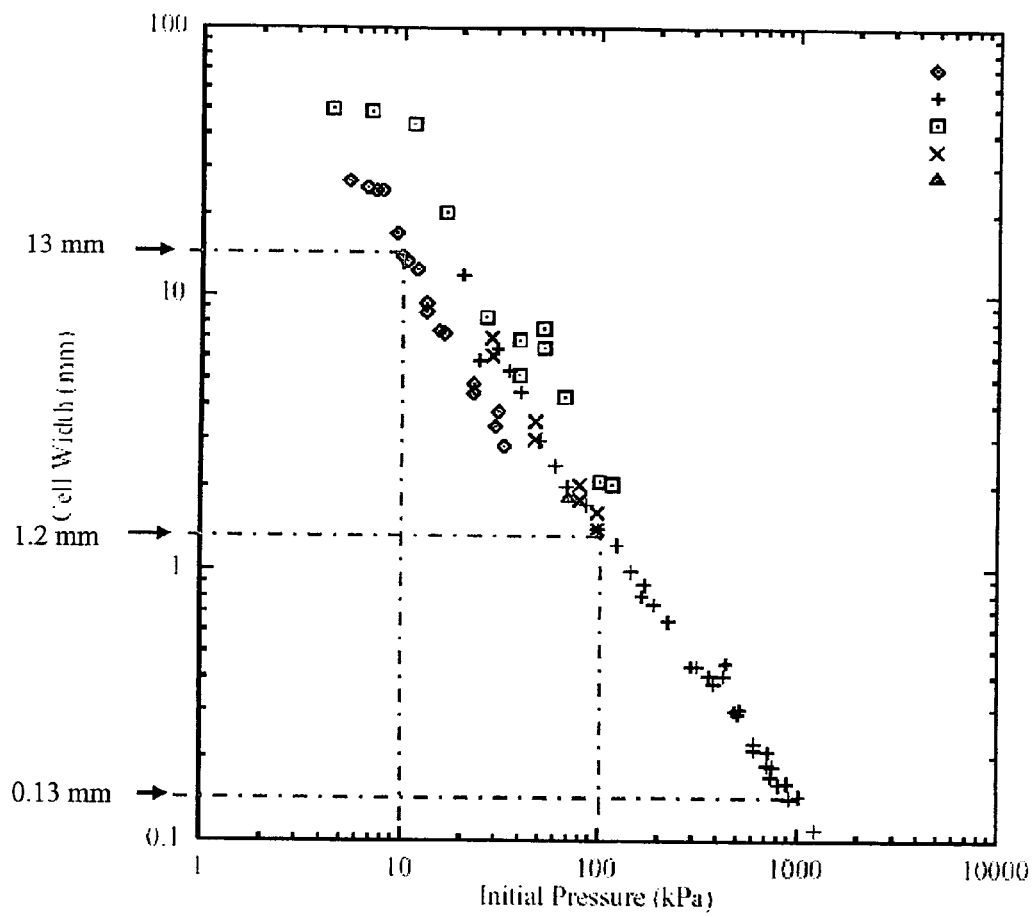
FIG. 5 Detonation Cell Size as a Function of Initial Pressure for a Hydrogen-Oxygen Mixture at an Equivalence Ratio of 1.0. (Reference: Kaneshige and Shepherd, Graduate Aeronautical Laboratories California Institute of Technology Pasadena, Calif. 91125, Explosion Dynamics Laboratory Report FM97-8, Jul. 30, 1997, Last Revision: Sep. 3, 1999.

Sources: (1) Glassman, I., 1996, *Combustion*, Academic Press, p.345, (2) Moen, I. O., 1993, op. cit. FIG. 5, (3) Kaneshige, M. and J. E. Shepherd, *Detonation Database*, Explosion Dynamics Laboratory Report FM97-8, Jul. 30, 1997 (Last Revision: Sep. 3, 1999), Graduate Aeronautical Laboratories, California Institute of Technology, Pasadena, CA 91125.

The detonation cell size can be determined both experimentally and numerically and has been tabulated for numerous fuel/oxidant/inert mixtures at various temperatures and pressures (e.g., Kaneshige and Shepherd, Graduate Aeronautical Laboratories California Institute of Technology Pasadena, Calif. 91125, Explosion Dynamics Laboratory Report FM97-8, Jul. 30, 1997, Last Revision: Sep. 3, 1999; Austin, J. M. and J. E. Shepherd, 2003, "Detonations in hydrocarbon fuel blends," *Combustion and Flame* 132, 73-90).

A microchannel can be designed to be inherently safe by limiting the channel gap, or its smallest dimension in a cross-sectional profile perpendicular to the direction of flow, to be no greater than the detonation cell size, $\lambda$. The greatest hazard is a pocket of hydrogen and oxygen forming in the microchannel and igniting. Cell size is a function of chemical composition (equivalence ratio), initial pressure, and initial temperature preceding ignition. Because the composition could vary throughout the system, the guidance for gap size selection assumes the most reactive mixture composition which is an equivalence ratio of 1.0. Using the data presented in FIG. 5, we compile the following guidance for maximum channel gap for hydrogen in an oxygen environment as a function of pressure tabulated in Table 2:

TABLE 2

Maximum Gap Size for Inherent Detonation Safety for Hydrogen in Oxygen as a Function of Initial Pressure.

| Pressure (kPa) | Maximum Gap Size (mm) |
|---|---|
| 10 | 13 |
| 50 | 3 |
| 100 | 1.2 |
| 500 | 0.3 |
| 1000 | 0.13 |

Note:
Data based on an initial temperature of 293 K and an oxygen equivalence ratio of 1.0. Maximum gap is the maximum size of the minimum dimension.

Figure 6:
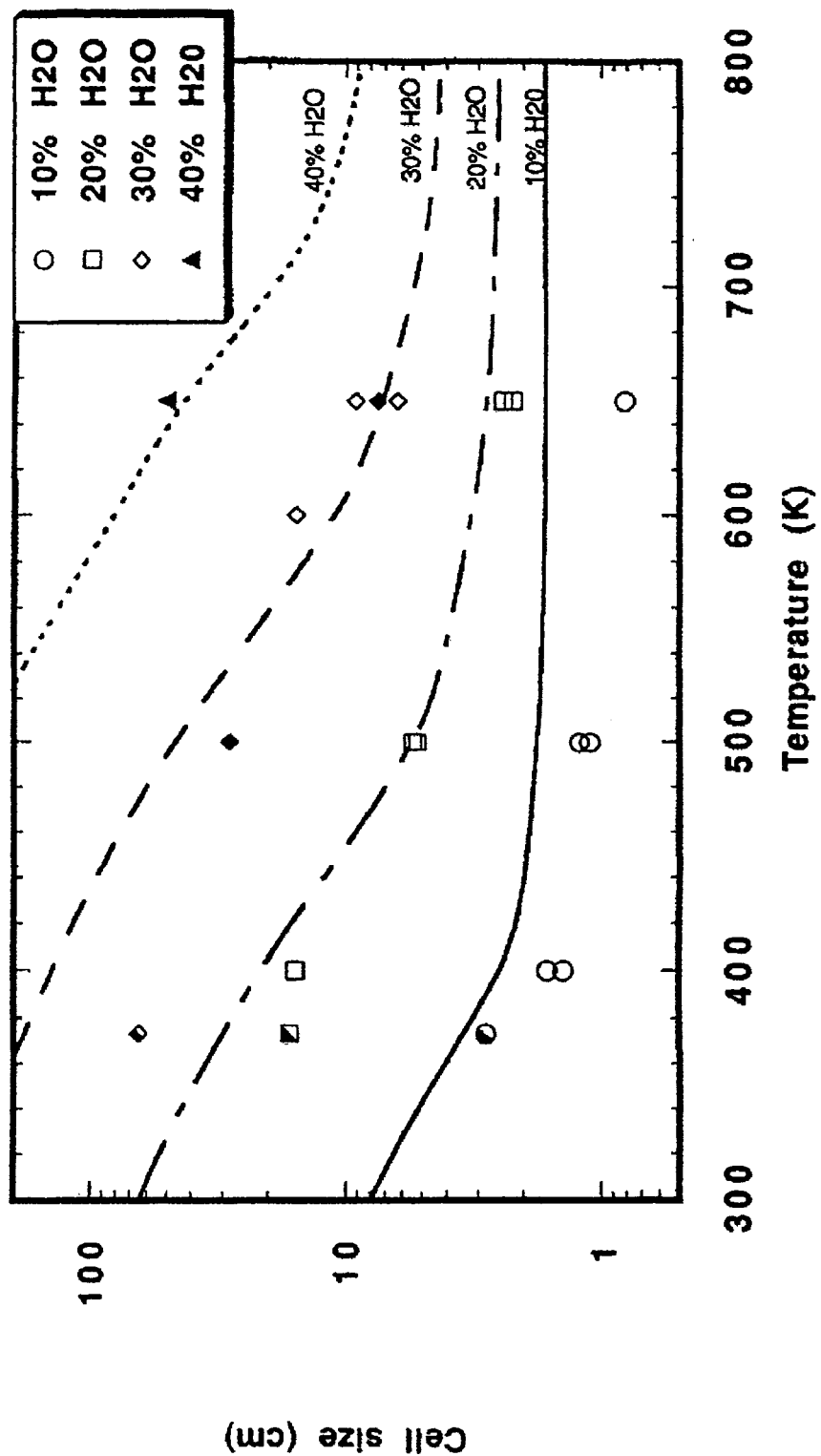
FIG. 6 Detonation Cell Size as a Function of Temperature for a H2/O2/N2/H2O Mixture with an Oxygen Equivalence Ratio of 1. Reference: Ciccarelli, et al, 1997, NUREG/CR-6391, U.S. Nuclear Regulatory Commission, Washington, D.C.

Detonation cell size also varies with temperature. FIG. 6 presents data on variation in cell size as a function of temperature for a hydrogen-oxygen-water and inert stream with the oxygen content adjusted to give an oxygen equivalence ratio of 1.0. The figure indicates that cell size reduces with increasing temperature but reaches a minimum value for successively higher values of initial temperature. Taking the most reactive case, specifically the 10% water data, it can be seen from FIG. 6 that the cell size decreases and then remains essentially constant for temperatures exceeding 500 K (227° C.). Between 300 K (which is considered close to the reference temperature of 293 K for the data presented in Table 2), and 500 K, there is a reduction in cell size of approximately by a multiplicative factor of 0.25. Therefore, updating Table 2 to include the effects of temperature range on cell size, the following guidance for maximum inherently safe channel gap size is tabulated in Table 3.

TABLE 3

Variation of Detonation Cell Size with Temperature for Various Pressures.

| | Cell Size (mm) as a function of Temperature (K) at Given Pressure (kPa) | | | |
|---|---|---|---|---|
| Pressure (kPa) | Temperature (K) 340 | Temperature (K) 380 | Temperature (K) 400 | Temperature (K) 500 |
| 10 | 7.31 | 4.88 | 4.06 | 3.25 |
| 50 | 1.69 | 1.13 | 0.94 | 0.75 |
| 100 | 0.68 | 0.45 | 0.38 | 0.30 |
| 500 | 0.17 | 0.11 | 0.09 | 0.08 |
| 1000 | 0.07 | 0.05 | 0.04 | 0.03 |

Figure 7:
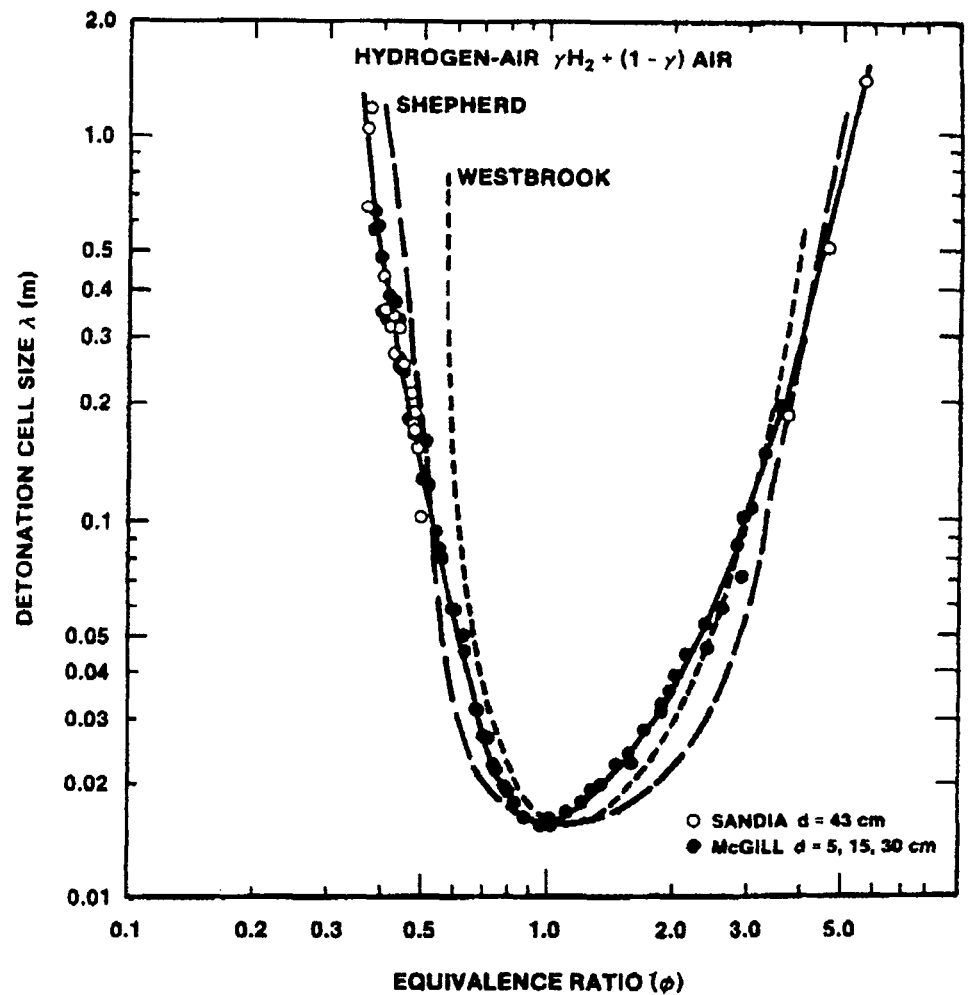
FIG. 7 Variation of Detonation Cell Size with Equivalence Ratio for Hydrogen in Air. Reference: Guirao, et al., 1989, NUREG/CR4961, U.S. Nuclear Regulatory Commission, Washington, D.C.

As illustrated in FIG. 7, the detonation cell size varies with oxygen equivalence ratio with a minimum cell size corresponding to an equivalence ratio of approximately 1.0. Processes designed for equivalence ratios significantly less or greater than 1.0 can take advantage of a much larger gap size and still remain below the critical dimension for detonation propagation.

Hydrogen Cell Size

As an example of cell size dependence on stream composition as well as initial temperature and pressure, the following correlation to compute the detonation cell size was developed for hydrogen combustion in air in the presence of water vapor:

$$\ln(\lambda) = \{a - m + [b/(A - k/B)^f + h \cdot (A - g \cdot B)^2 + i \cdot (A - g \cdot B)] \cdot (1 + d \cdot C + e \cdot B \cdot C^2) \cdot j/B\} \cdot (D - c) \cdot [1/(0.1 - c) + n \cdot (D - 0.1)] + m$$

where the input variables are given by:

$A$ = dry hydrogen concentration $[H2]dry = H2/(H2 + air)$, vol %.

$B$ = initial temperature T, K.

$C$ = steam concentration, vol %.

$D$ = initial pressure, MPa.

$\lambda$ = detonation cell size, cm.

and the correlation parameters are fixed for the hydrogen/air/water system as follows:

$a = -1.13331E+00$ $b = 4.59807E+01$ $c = -1.57650E-01$ $d = 4.65429E-02$ $e = 3.59620E-07$ $f = 9.97468E-01$ $g = -2.66646E-02$ $h = 8.74995E-04$ $i = -4.07641E-02$ $j = 3.31162E+02$ $k = -4.18215E+02$ $m = 2.38970E+00$ $n = -8.42378E+00$

The regression mean-square deviation for this expression as compared to experimental test data is reported to be 0.172.

Source: Gavrikov, A. I., A. A. Efimenko, and S. B. Dorofeev, 2000, "A Model for Detonation Cell Size Prediction from Kinetics," *Combustion and Flame* 120: 19-33.

Example 2

Calculation of Hydrogen/Oxygen Maximum Allowable Channel Gap

The above correlation was used to compute the predicted detonation cell size as a function of dry hydrogen concentration and steam concentration for various initial temperatures. The results of the cell size predictions and their comparison to experimental data is given in Table 3A.

TABLE 3A

Comparison of Predicted to Experimentally Measured Detonation Cell Size for a $H_2/O_2/H_2O$ System.

| Dry Hydrogen Concentration, Vol % | Steam Concentration, Vol % | Initial Temperature, K | Initial Pressure, MPa | Predicted Detonation Cell Size, cm | Measured Detonation Cell Size, cm |
| --- | --- | --- | --- | --- | --- |
| 30 | 10 | 375 | 0.1 | 1.67 | 1.57 |
| 30 | 10 | 500 | 0.1 | 1.25 | 1.11 |
| 30 | 10 | 650 | 0.1 | 1.04 | 0.95 |
| 30 | 20 | 375 | 0.1 | 2.93 | 3.16 |
| 30 | 20 | 500 | 0.1 | 2.01 | 2.12 |
| 30 | 20 | 650 | 0.1 | 1.58 | 1.35 |
| 30 | 30 | 375 | 0.1 | 5.30 | 5.47 |
| 30 | 30 | 500 | 0.1 | 3.34 | 4.06 |
| 30 | 30 | 650 | 0.1 | 2.50 | 2.23 |

Note:
Experimental data was taken from FIG. D.2-2 in Appendix D of the OECD study (Flame Acceleration and Deflagration to Detonation Transition in Nuclear Safety (State-of-the-Art Report by a Group of Experts), OECD Nuclear Energy Agency, NEA/CSNI/R(2000)7, August 2000).

General Hydrocarbon Mixture Cell Size

At this point, it has been established by means of the specific example of hydrogen in oxygen, how it is possible to design the channel gap appropriately to obtain the maximum gap size and still remove the possibility of a gas phase detonation. Potential data sources for the development of similar correlations for detonation cell size for general hydrocarbon mixtures include Dorofeev, S. B., M. S. Kuznetsov, V. I. Alekseev, A. A. Efimenko, and W. Breitung, "Evaluation of limits for effective flame acceleration in hydrogen mixtures," *Journal of Loss Prevention in the Process Industries* 14 (2001) 583-589; Kaneshige and Shepherd, op. cit., and Austin and Shepherd, Combustion and Flame 132 (2003), 73-90.

Channel Expansion Limits

In many microchannel applications, individual process channels are connected by means of a micro-to-macro manifold which enables flow to be collected into a common plenum and delivered to a specific point in the process. The micro-to-macro manifold interface oftentimes results in a sudden expansion in the flow domain. This sudden expansion could potentially promote turbulent mixing and flame jet ignition by the deflagration flame front propagating down the channel immediately upstream of the expansion. On the other hand, in some instances, the sudden expansion can reduce the ability of the flame front to support a detonation because the shock waves generated at the combustion front have more distance to travel (and thus more attenuation in strength) before they can reflect off the sides of the expanded process zone and recompress the fluid at the flame front.

Analogous to the guidance presented above for safely sizing the maximum channel gap to avoid detonation, the maximum allowable physical channel gap size H leading to a sudden expansion in the manifold compartment containing a flammable mixture can also be compared to the chemical length scale by means of the detonation cell size. The necessary criteria for deflagration-to-detonation transition (DDT) occurring at a sudden expansion are expressed in a form of $H > \alpha \lambda$. The value of the constant $\alpha$ depends on the particular geometrical configuration of the channel. Table 4 provides guidance on the maximum allowable channel gap that will support a DDT at a sudden expansion.

It is important to note here that the critical dimensions specified in Table 4 (either the maximum diameter for a circular tube or the maximum gap for a rectangular channel) exceed the guidance given above for preventing detonation in an indeterminate length of circular or rectangular channel. Thus, channels must possess a size of at least equal to exceeding the critical dimension given in Table 4 in order for a detonation to successfully propogate into an "unconfined" space such as a large, sudden expansion in the flow cross sectional area. Totally unconfined explosions are nearly impossible to achieve and in reality all detonation propagation is at least semi confined. For the purposes of using Table 4, a review of the critical tube data published in the explosion data base (Kaneshige and Shepherd, op. cit.) indicates that a large sudden expansion consists of a sudden change in cross-sectional area of at least 55 times the total cross-sectional area of the channels leading into the sudden expansion containing the potentially explosive mixture of hydrogen in oxygen. Therefore, if the cross-sectional area increases by at least 55 times and the channel dimensions interfacing with this expansion do not exceed the critical dimensions given in Table 4, detonation propagation will terminate at the sudden expansion and become at worst case a deflagration. If the design intent is to preclude the possibility of a detonation in the channels upstream of the sudden expansion, then it is necessary to either (1) return to the guidance above for limiting rectangular channel gaps to $\lambda$ or tube diameters to $\lambda/3$ for indeterminate lengths of channel or (2) limit the channel length as described below or suppress turbulent flow as described below.

TABLE 4

Criteria for DDT Propagation from a Channel into a Sudden Expansion.

| Upstream Channel Geometry | Depiction | Critical Dimension | Critical Value ($\lambda$ denotes detonation cell size) |
| --- | --- | --- | --- |
| Circular Tube or Pipe | 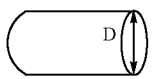 | Diameter, D | 13 $\lambda$ |
| Square Channel (aspect ratio of 1) |  | Channel Gap, H | 11 $\lambda$ |

TABLE 4-continued

Criteria for DDT Propagation from a Channel into a Sudden Expansion.

| Upstream Channel Geometry | Depiction | Critical Dimension | Critical Value (λ denotes detonation cell size) |
|---|---|---|---|
| Rectangular Channel (aspect ratio of 0.2 or lower) | 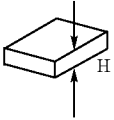 | Channel Gap, H | 3 λ |
| One-sided Channel (Expansion is bounded on one side by a wall that is coplanar with one wall of the upstream channel, aspect ratio of 0.2 or lower) | 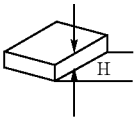 | Channel Gap, H | 1.5 λ |

Source: Berman, M., 1986, "A Critical Review of Recent Large-Scale Experiments on Hydrogen-Air Detonations," Nuclear Science and Engineering 93, 321-347. Organization for Economic Co-operation and Development, Nuclear Energy Agency Committee on the Safety of Nuclear Installations, *Flame Acceleration and Deflagration-to-Detonation Transition in Nuclear Safety* NEA/CSNI/R(2000)7, Oct. 10, 2004.

For purposes of using Table 4, a rectangular channel with an aspect ratio between 0.2 and 1 should use the lower of the two critical channel gaps, namely 3λ. Furthermore, the last entry in Table 4, the one-sided channel, is applicable where a rectangular channel suddenly terminates into a large, sudden expansion but where one wall along the largest of the two dimensions in the cross-sectional area of the channel continues into the expansion.

Example 3

Determination of Maximum Allowable Channel Gap at a Sudden Expansion for a Rectangular Channel Suppose a microchannel design that has a channel with a rectangular cross-section and a channel height-to-width ratio of 0.1 requires a macro-to-micro (M2M) interface that will incorporate a sudden expansion. The detonation cell size has been determined under worst-case conditions and has been determined to be some value, say $\lambda^*=1.5$ mm. The designer wishes to exceed this channel gap by appropriately limiting the length to less than the detonation run-up distance $L^*$ (see Example 4). What is the maximum gap size allowable for the micro-to-macro manifold that will not permit DDT at the expansion? Referring to Table 4, an expansion connected to a rectangular channel with a low aspect ratio or alternatively low height-to-width ratio of 0.2 or less is limited to 3λ in gap size where λ denotes the detonation cell size. Therefore, the channel gap in this case must not exceed $3\lambda^*$ or 4.5 mm in order to protect against a DDT developing in the M2M.
Limit Channel Length For rectangular channels of any aspect ratio, when the channel gap exceeds an experimentally-measured quantity called the detonation cell size, a flame propagating through a premixed fuel/oxidant stream may accelerate through a sufficiently long length of channel to transition to a detonation. A detonation is defined as a combustion wave propagating at supersonic speed relative to the unburned gas immediately ahead of the flame. Unlike a deflagration wave, which is associated with a relatively weak overpressure field of at most one atmosphere, a detonation wave can generate a much more intense blast field with overpressure in the range of 1 to 20 atmospheres.

In order for the transition from deflagration to detonation to take place, the flame propagation speed must accelerate to flame speeds of nearly 2000 m/s for most hydrocarbon/air mixtures.

Detonation velocities for some typical fuel species in stoichiometric proportions with air at atmospheric pressure are at least one order of magnitude greater than typical flow velocities in microchannel applications. Furthermore, there is a chemical induction period, which is usually related to channel length that must be available for acceleration up to the critical velocity. Finally, the feedback mechanism for a detonation generally relies on turbulent flow at the propagating flame front.

It should be noted, furthermore, that both the experiments and numerical predictions are based on long extents of premixed fuel and oxidant. In a commercial application of microchannel technology, premixed feeds may be added at one end of the reactor channel or there may be staged addition of oxidant into a fuel stream (or staged addition of fuel). Both approaches result in depletion of reactants along the length of the channel. The net result of this axial depletion is that the flame front is not permitted to accelerate through a space of unconsumed reactants and accelerate to critical detonation flame speeds.

When channel gap dimensions are less than the cell detonation size, a gas-phase detonation event cannot take place. However, it is also possible to use microchannel dimensions with gap sizes exceeding the detonation cell size if the flow path length is sufficiently short to preclude acceleration of the flame to a critical speed following ignition.

As described above, the flame must accelerate to a minimum detonation velocity magnitude to achieve DDT. Example detonation velocities at ambient conditions for various fuel sources in air are given in Table 5.

TABLE 5

Equilibrium Detonation Velocity Magnitude for Various Fuel-Air Mixtures (stoichoimetric composition, atmospheric initial pressure: 101.3 kPa, initial temperature: 298.15 K).

| Fuel | % Fuel by volume | Detonation Velocity Magnitude (m/s) |
|---|---|---|
| Acetylene | 7.75 | 1864 |
| Hydrogen | 29.6 | 1968 |
| Ethylene | 6.54 | 1822 |
| Ethane | 5.66 | 1825 |
| Propylene | 4.46 | 1809 |
| Propane | 4.03 | 1798 |
| n-Butane | 3.13 | 1796 |
| Methane | 9.48 | 1801 |
| Hydrogen sulfide | 12.3 | 1647 |
| n-Hexane | Aerosol suspension | 1795 |

Source: I. O. Moen, op. cit., p.164.

Generally, full turbulent flame propagation is required for DDT. There are a number of correlations available for estimating the turbulent flame speed. The value obtained for maximum turbulent flame speed from the appropriate correlation can be either compared to the detonation velocity magnitude (e.g., Table 5) or used to calculate local Mach number and compare it to the threshold value of 1.2 to determine if the flame front satisfies the necessary conditions for DDT. If the DDT criteria are not satisfied, the channel is safe from a detonation standpoint.

Figure 8:
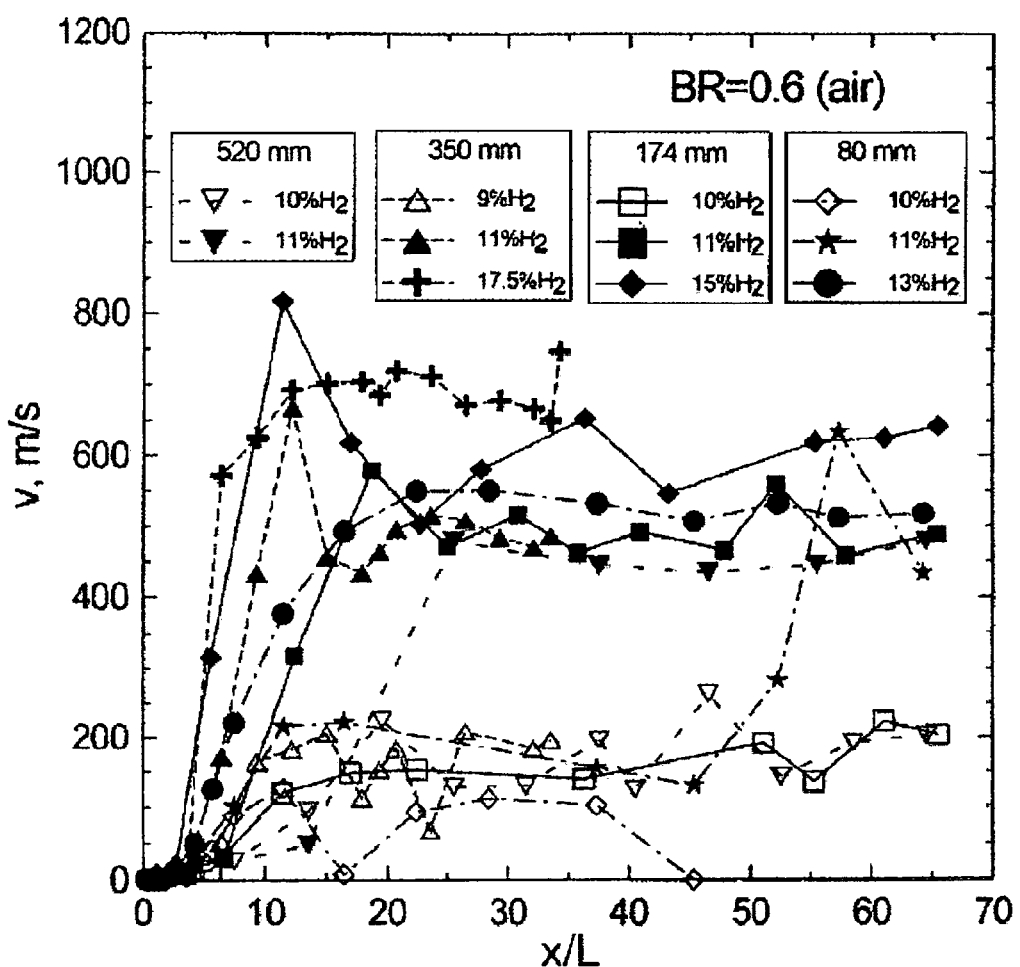
FIG. 8 Measured flame propagation velocity versus reduced distance along four tubes of different diameters (L=80, 174, 350, 520 mm) for lean hydrogen-air mixtures and 60% blockage ratio. Solid symbols represent the fast combustion regime, open symbols represent the slow regime. (Source: Breitung, W. and P. Royl, 2000, "Procedure and tools fore deterministic analysis and control of hydrogen behavior in severe accidents," Nuclear Engineering and Design 202, 249-268).

However, the turbulent flame speed calculations are generally difficult to perform and oftentimes open to debate and uncertainty. A simpler, conservative approach is to assume the maximum flame speed does satisfy the DDT criteria, and then determine the minimum run-up distance required to reach and sustain velocity magnitudes at detonation speed. Considering again the example of a hydrogen/air/steam system, the run-up distance to maximum flame speed is provided in FIG. 8 as a function of distance from the ignition point for premixed combustion propagating down a cylindrical pipe. Thus, in the case of a 174 mm diameter tube with an annular blockage ratio of 0.6, at 15% hydrogen in air (volumetric basis), a maximum flame speed of 800 m/s was achieved at a distance of 0.8 meters downstream of the ignition point. This example is chosen to highlight the fact that while it is possible to establish the necessary conditions for flame acceleration to exist, there is no known comprehensive theory for estimating the magnitude of flame acceleration based on given mixture composition, thermodynamic state, and flow conditions. Therefore, at present, estimates of run-up distances to maximum flame speed are based solely on experimental determination. Well established procedures exist for reconstructing the velocity of flame front propagation as a function of spatial location in both micro-scale and macro-scale explosion tests (e.g., Hajossy, R. and I. Morva, 1998, "The optimum experimental design for reconstruction of flame-front propagation in a long pipe," Measurement Science Technology 9, 100-108). The example below illustrates the use of both empirical and computer simulation results for estimating the detonation run-up distance for a hydrogen-oxygen system.

Example 4

Determining the Run-up Distance L* for Hydrogen Combustion in Pure Oxygen in a Straight Channel We return to the conditions set in Example 1, namely combustion in a hydrogen-oxygen system with an equivalence ratio $\phi=1.6$ which was established to possess the potential for a detonable mixture. Assuming the channel gap exceeds the detonation cell size and an ignition source of sufficient strength leads to ignition, this example illustrates a means of estimating the maximum length of a straight channel before the flame accelerates to detonation velocity. The terminal end of the channel can be completely blocked to flow or undergo an expansion not to exceed the criteria established in Table 5 or any other means of quenching the flame when it reaches the end of the channel and thereby protect against the possibility of transition to detonation.

The formula for estimating the run-up distance is as follows:

$$L^* = \int_0^{t_{lam}} v_{lam}(\tau)d\tau + \int_0^{t_{DDT}} v_{DDT}(\tau)d\tau$$

where $\tau$ denotes a dummy variable of integration representing time and $t_{lam}$=time duration in the laminar flame propagation regime
$t_{DDT}$=time duration laminar and fully turbulent regimes leading to DDT
$v_{lam}$=laminar velocity magnitude (a function of time)
$v_{DDT}$=velocity magnitude between laminar propagation and detonation conditions The velocity magnitude for both the laminar propagation regime and the acceleration phase up to detonation conditions are implicitly a function of time. Since this functional relationship is generally not known, suitable estimates for $v_{lam}$ and $v_{DDT}$ are made based on empirical data and conservative approximations.

Figure 9:
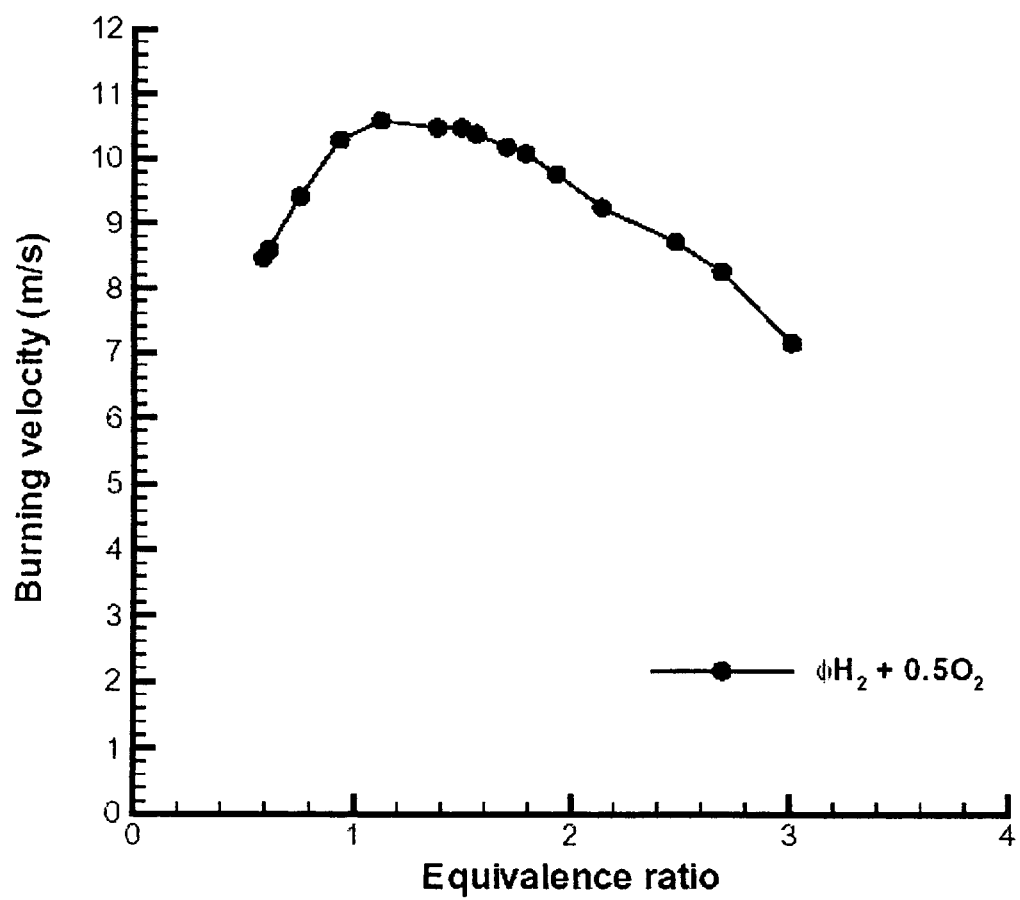
FIG. 9 Laminar Burning Velocity versus Equivalence Ratio for Select Fuel-Oyxgen Mixtures. Reference: E. Schultz, E. Wintenberger, J. E. Shepherd, 1999 "Investigation of Deflagration to Detonation Transition for Application to Pulse Detonation Engine Ignition Systems," Proceedings of 16th JANNAF Propulsion Symposium, Cocoa Beach, Fla. Oct. 8, 1999.
Figure 10:
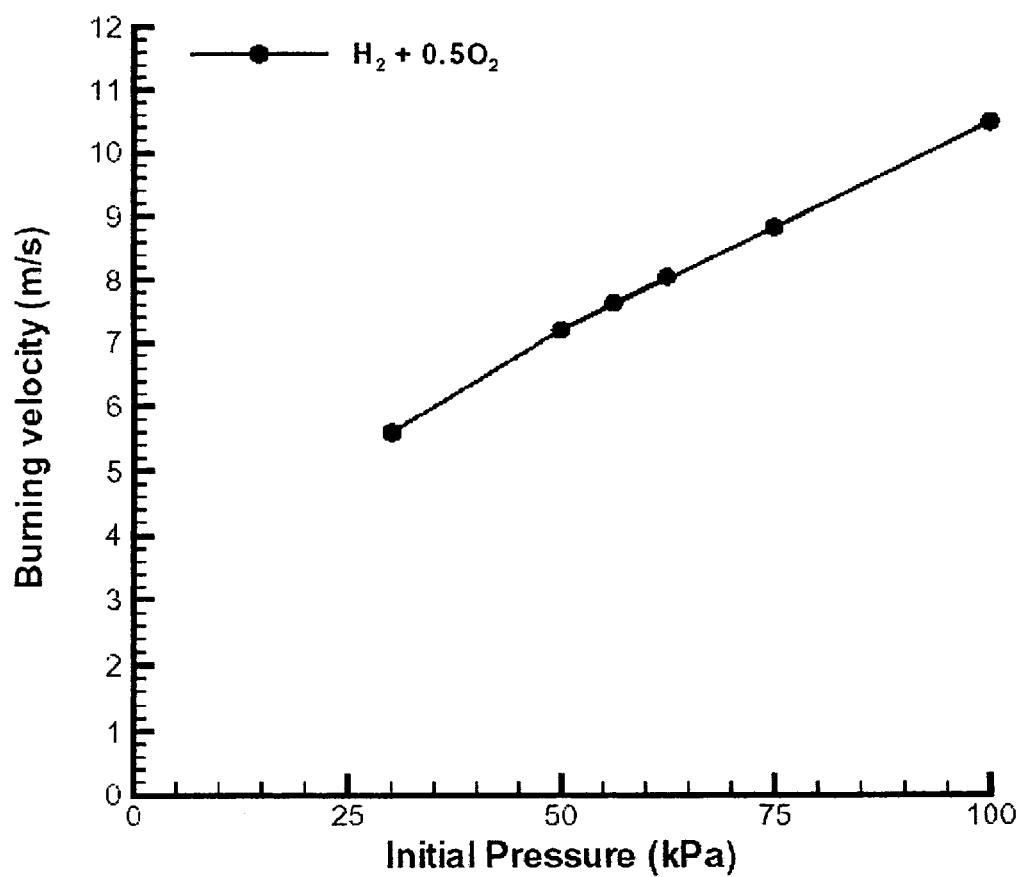
FIG. 10 Laminar Burning Velocity versus Initial Pressure for Select Fuel-Oyxgen Mixtures. References: Fristrom, R. M. (1995) Flame Structure and Processes. JHU/APL Series in Science and Engineering, Oxford University Press, and Zabetakis, M. G. (1965) Flammability characteristics of combustible gases and vapors. Bulletin 627, Bureau of Mines.
Figure 11:
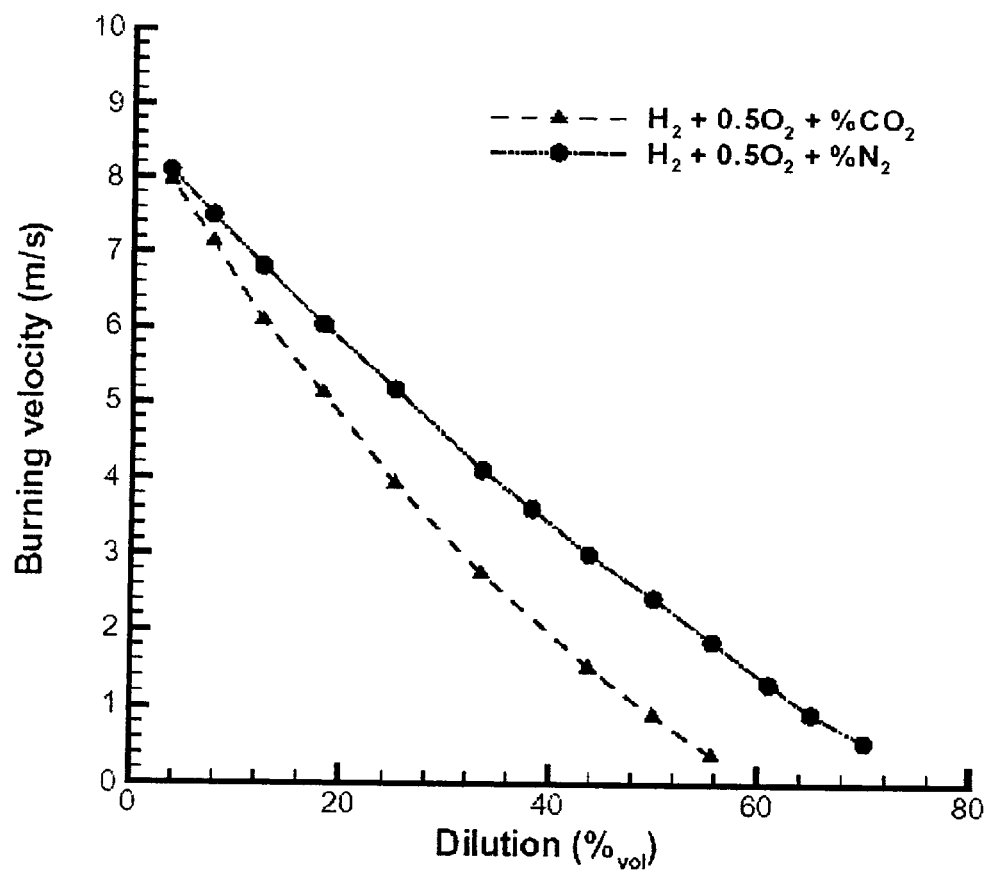
FIG. 11 Laminar Burning Velocity versus Dilution with Inert for Select Fuel-Oyxgen Mixtures. References: Zabetakis, M. G. (1965) Flammability characteristics of combustible gases and vapors. Bulletin 627, Bureau of Mines; Warnatz, J. (1981) Concentration, pressure, and temperature dependence of the flame velocity in hydrogen-oxygen-nitrous oxide mixtures. Combustion Science and Technology, 26:203-213, and Gaydon, A. G., and H. G. Wolfhard (1979) Flames: Their Structure, Radiation, and Temperature. Chapman and Hall, 4th edition.

In the case of $v_{lam}$, laminar flame speed data obtained from the literature are plotted versus equivalence ratio, initial pressure and percent dilution in FIGS. 9, 10, and 11, respectively. For closed-end channels, this data should be multiplied by the expansion ratio $\sigma$ to obtain the correct value of laminar flame velocity.

Using FIG. 9, we determine that for an equivalence ratio of 1.6 the burning velocity for hydrogen in oxygen is approximately 10.8 m/s for an open-end channel. In the case of a closed-end channel, the velocity should be multiplied by the value of the expansion ratio $\sigma$ which was determined to be approximately 8 in Example 1. Therefore, in this instance, the laminar flame speed would be 86.4 m/s.

Figure 12:
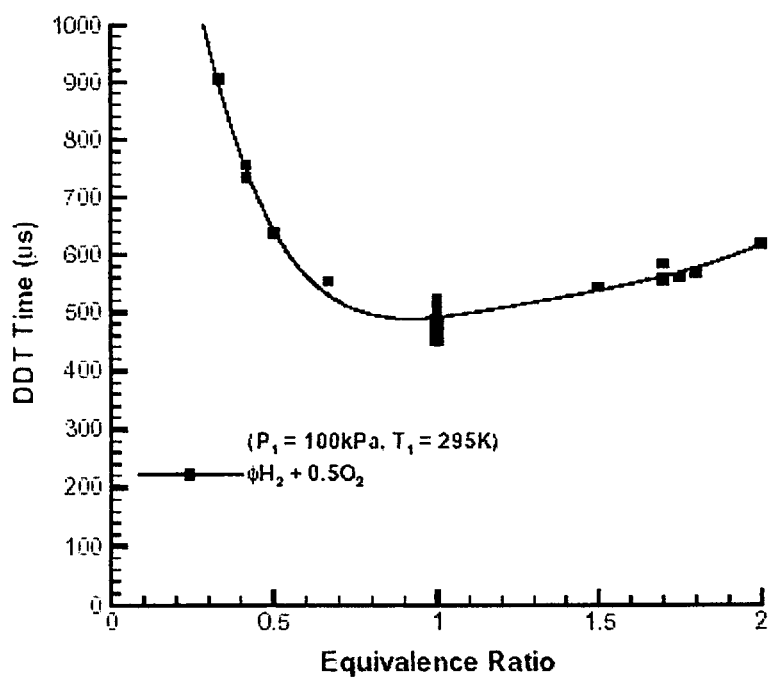
FIG. 12 DDT Time versus Equivalence Ratio for Select Fuel-Oxygen Mixtures. Reference: E. Schultz, E. Wintenberger, J. E. Shepherd, 1999 "Investigation of Deflagration to Detonation Transition for Application to Pulse Detonation Engine Ignition Systems," Proceedings of 16th JANNAF Propulsion Symposium, Cocoa Beach, Fla. Oct. 8, 1999.

Even if the laminar flame speed can be accurately determined, current state of knowledge does not include a comprehensive means of calculating flame acceleration. Therefore, the calculation will rely upon empirical data for flame acceleration times which consist primarily of time for DDT. Therefore, our calculation detonation run-up distance L* will neglect the first term representing laminar acceleration (generally a small contributor to the overall length) and instead focus solely on the contribution due to acceleration from a (turbulent) deflagration flame to a detonation wave front. The data presented here is based on a study of pulsed detonation using Shelkin spirals to accelerate a flame deflagration to detonation conditions (Reference: E. Schultz, E. Wintenberger, J. E. Shepherd, 1999 "Investigation of Deflagration to Detonation Transition for Application to Pulse Detonation Engine Ignition Systems," Proceedings of 16th JANNAF Propulsion Symposium, Cocoa Beach, Fla. Oct. 8, 1999). With an equivalence ratio of 1.6 and using the data given in FIG. 12, the DDT time is approximately $5.5\times10^{-4}$ second. In this study of 250 individual trials, no deflagration was observed to successfully transitioned to a detonation when the initial flame front de-accelerated to a speed less than $U_{DDT,min}$=1000 m/s at initial conditions at the time of ignition of 1000 kPa, 295 K, and a $H_2$ to $O_2$ ratio of 2. Therefore, conservatively taking the maximum flame speed to be 1000 m/s, the distance traveled during the acceleration from deflagration to detonation was 0.55 meters or 21.6 inches:

$$L^*=U_{DDT,min}(DDT\text{Time})=(1000 \text{ m/s})(5.5\times10^{-4} \text{ s})=0.55 \text{ m}$$

Note that this run up length estimate is independent of channel width and height but rather is solely a function of initial composition and ignition characteristics.

Figure 15:
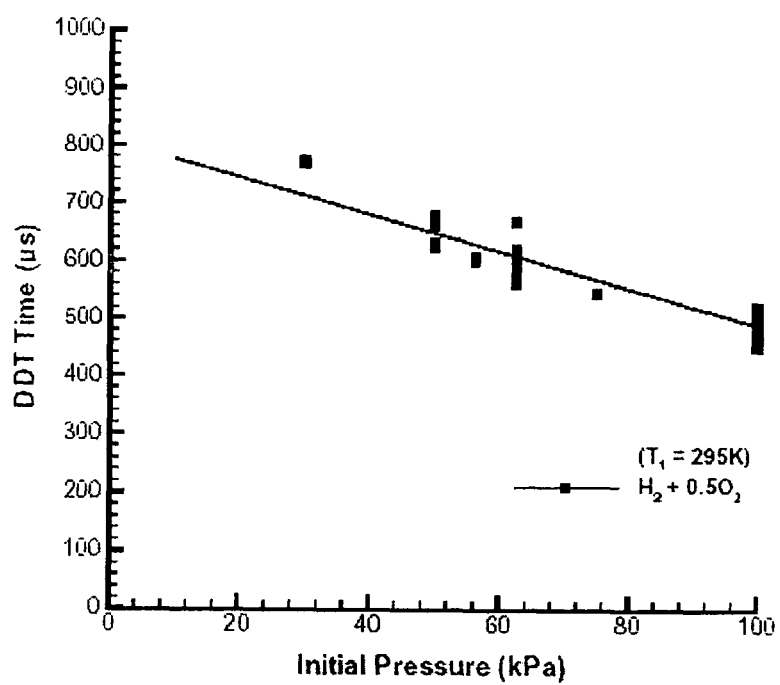
FIG. 15 shows DDT Time Parameter versus Initial Pressure for Select Fuel-Oxygen Mixtures. Reference: E. Schultz, E. Wintenberger, J. E. Shepherd, 1999 "Investigation of Deflagration to Detonation Transition for Application to Pulse Detonation Engine Ignition Systems," Proceedings of 16th JANNAF Propulsion Symposium, Cocoa Beach, Fla. Oct. 8, 1999.
Figure 16:
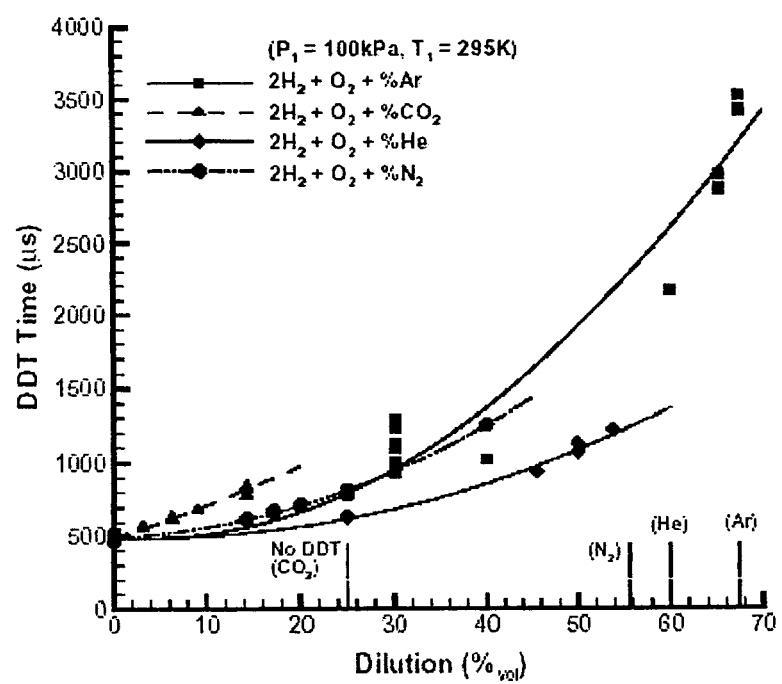
FIG. 16 shows DDT Time Parameter versus Dilution with Inert for Select Fuel-Oxygen Mixtures. Reference: E. Schultz, E. Wintenberger, J. E. Shepherd, 1999 "Investigation of Deflagration to Detonation Transition for Application to Pulse Detonation Engine Ignition Systems," Proceedings of 16th JANNAF Propulsion Symposium, Cocoa Beach, Fla. Oct. 8, 1999.

Finally, for a given stoichiometric ratio, DDT can also be correlated to initial pressure and percentage dilution by inert at the time of ignition as exemplified in FIGS. 15 and 16, respectively.

Limit Channel Turbulence and Flame Acceleration

The velocities associated with the gas-phase detonation flame speed thresholds are characteristic of turbulent flow. A lower bound for flame velocity magnitude satisfying turbulent flow conditions is as follows:

$$u_f > 1050(\varepsilon+1)\frac{v}{H}$$

where
$u_f$=turbulent flame speed limit
$v$=fluid mixture kinematic viscosity

H=channel height or flow gap
ε=channel aspect ratio=H/W where W is the channel width Example 5

Flame Propagation Regime for Combustion of Hydrogen in Air

Take as an example the case of hydrogen in air at stoichiometric composition and 1 atmosphere pressure. The flame temperature is approximately 3080 K. At this temperature, pressure and composition, the kinematic viscosity of the unreacted species just upstream of the flame front is approximately $1.8–10^{-3}$ m²/s. For a channel gap equal to the hydrogen detonation cell size at ambient temperature and pressure, namely 5 mm, and a channel aspect ratio of 0.2, the lower bound for flame turbulence is calculated from the above expression to be approximately 454 m/s:

$$u_f > 1050(0.2+1)\frac{1.8\times 10^{-3} m^2/s}{5\times 10^{-3} m} = 454\ m/s$$

The flame Mach number is defined as $$M_f = \frac{u_f}{\sqrt{\gamma RT}}$$

where
γ=specific heat ratio
R=ideal gas constant
T=gas temperature
At this composition, the ideal gas constant evaluates to 693 N-m/kg-K and the specific heat ratio is approximately 14. Evaluating the Mach number at the flame temperature T=3080 K we obtain a value of 0.26:

$$M_f = \frac{424\ m/s}{\sqrt{(1.4)\left(693\frac{N\cdot m}{kg\cdot K}\right)(3080\ K.)}} = 0.26$$

The flow is therefore certainly compressible, but is far from the conditions necessary for transition to detonation at this stage, which would require a Mach number of between 1 and 1.2.

Figure 13:
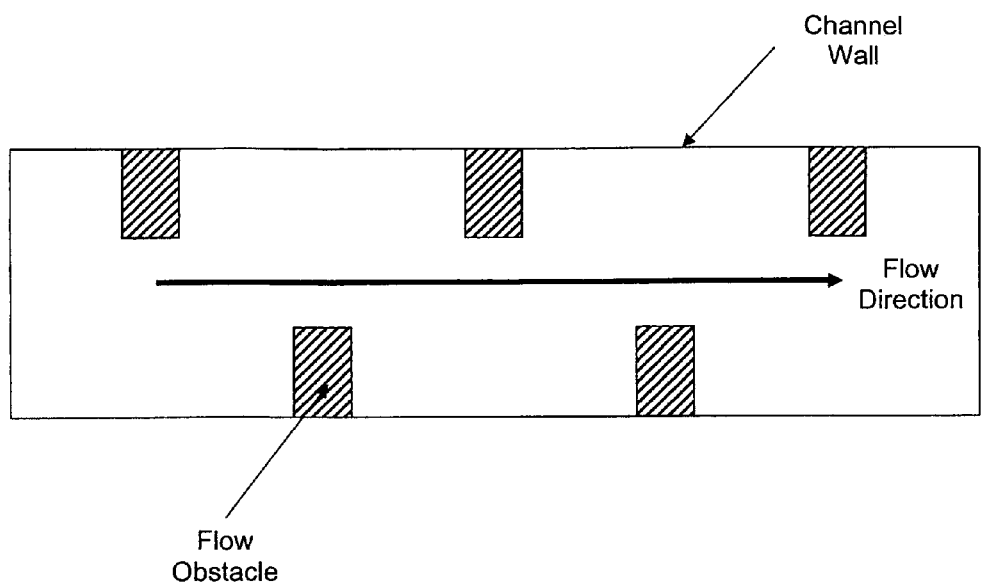
FIG. 13 is a schematic illustration of channel blockages that may create turbulence and promote detonation.

Flame acceleration and turbulence levels are enhanced by certain classes of obstacles to flow in the flow stream path. These classes of obstacles would include periodic or non-periodic placement of bluff restrictions to flow such as channel support ribs oriented cross-stream to the bulk flow direction (see FIG. 13). Therefore, these features are undesirable for safety reasons.

Figure 14:
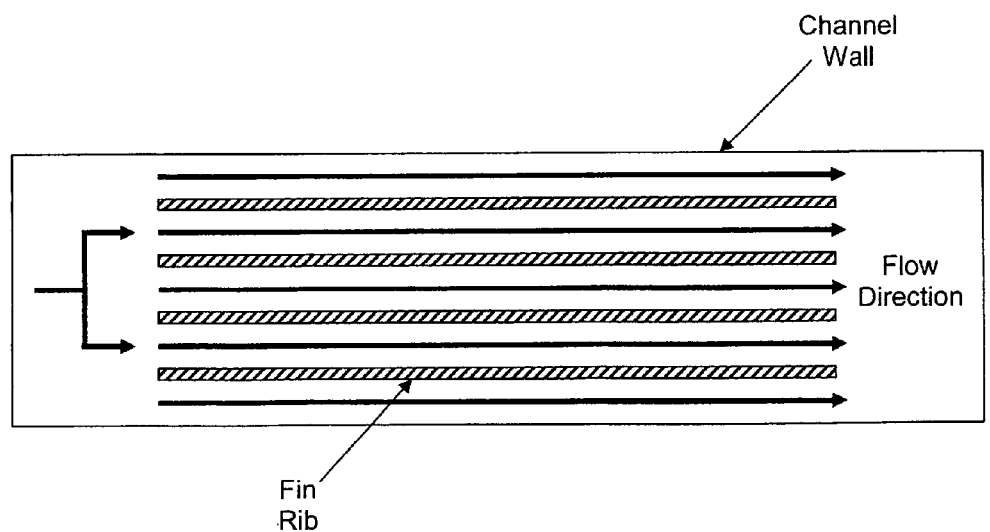
FIG. 14 is a schematic illustration of fins that are oriented with their long axis in the direction of flow. These features tend to suppress turbulence, suppress detonation, and induce flame stretching.

On the other hand, there are engineered features in microchannels that can actually serve to suppress turbulence or stretch the flame in such a manner that a detonation wave cannot be supported. Examples of these types of configurations would include fin structures oriented in the direction of flow (see FIG. 14).

The three major features within a microchannel that determine if the presence of a feature will either promote or suppress turbulence are the following:

The specific geometry of the feature,
The size of the feature, classified according to its blockage ratio, and
The separation distance between successive features.

Bluff bodies, especially when separated by a fixed distance repeated three or more times with a blockage ratio of between 0.3 and 0.6, enhance turbulence and promote DDT. Structures like fins oriented in the direction or flow features with a blockage ratio exceeding 0.6 and a decrease in separation distance suppress turbulence. Turbulence is enhanced to the greatest degree when the blockage ratio is approximately 0.4. In this event, the size of the unobstructed passage gap H must exceed the detonation cell size λ in order for transition to detonation to take place. This guidance is based on experimental data and is most applicable to channels, having a length of more than 20 times their width.

Any combination of in-channel geometric features can be used without incurring the risk of DDT if either one of the following two conditions are satisfied (1) the flame speed is everywhere less than $u_f$ given in the above equation or (2) the unobstructed distance d between opposing features in the gap-wise dimension of the channel (either walls, obstacles to flow, or any combination) does not exceed the 80% of the detonation cell size λ (i.e., d/λ≦0.8). This constraint can be relaxed somewhat based on data available from the OECD study (Flame Acceleration and Deflagration to Detonation Transition in Nuclear Safety, OECD Nuclear Energy Agency, NEA/CSNI/R(2000)7, August 2000) for select combinations of blockage ratio, channel aspect ratio, and the ratio s/d where s represents the distance between successive obstacles to flow within the channel. Table 6 provides guidance on the maximum allowable value for d/λ to prevent DDT in channels with obstacles for specific geometric configurations.

TABLE 6

Critical Conditions for DDT in Rectangular Channels with Various Configuration of Flow Obstacles.

| Blockage Ratio | Aspect Ratio | Ratio obstacle spacing to maximum allowable unobstructed passage, s/d | Ratio maximum allowable unobstructed passage to detonation cell size, d/λ |
|---|---|---|---|
| 0.43 | 0.28 | 1.6 | 3.6 |
| 0.43 | 0.28 | 3.2 | 2.7 |
| 0.45 | 0.90 | 1.07 | 2.3 |
| 0.45 | 0.90 | 2.14 | 1.5 |
| 0.45 | 0.90 | 4.28 | 0.8 |

What is claimed:

1. A method of safely conducting a potentially explosive reaction, comprising:
flowing a detonable gas mixture through a microchannel; and
conducting a reaction with the gas mixture contained in the microchannel;
wherein the microchannel containing the detonable gas mixture has a channel gap greater than a quench gap; and
further comprising a safening characteristic comprising at least one of:
(a) wherein the microchannel containing the detonable gas mixture comprises a channel gap detonation cell size, and wherein the channel gap detonation cell size is smaller than a cell size required to allow a detonation; or
(b) wherein the microchannel has a length less than a detonation run-up length L*; or (c) maintaining flow in a laminar region, transitional region, or turbulent region at a velocity below Mach 1.0, throughout the microchannel.

2. The method of claim 1 wherein the microchannel containing the detonable gas mixture comprises a channel gap detonation cell size, and wherein the channel gap detonation cell size is smaller than the cell size required to allow a detonation.

3. The method of claim 1 wherein flow in the microchannel is maintained in a transitional region or turbulent region at a velocity below Mach 1.0, throughout the microchannel.

4. The method of claim 1 wherein the microchannel has a size greater than two times the quench gap.

5. The method of claim 4, wherein there is no staged addition into the microchannel.

6. The method of claim 4 wherein the gas mixture comprises $H_2$ and $O_2$.

7. The method of claim 4 wherein the gas mixture comprises any of the following fuel, oxidant, and inert combinations: hydrogen-oxygen; hydrogen-oxygen-nitrogen; hydrogen-oxygen-steam-nitrogen; hydrogen-air-carbon monoxide; hydrogen-oxygen-carbon dioxide; hydrogen-nitrous oxide-nitrogen; hydrogen-oxygen-argon; hydrogen-oxygen-helium; hydrogen-oxygen-nitrogen-argon; hydrogen-chlorine; hydrogen-oxygen-helium-carbon dioxide; hydrogen oxygen-helium-water; carbon monoxide-oxygen-argon; carbon monoxide-hydrogen-oxygen-argon; carbon monoxide-acetylene-oxygen-nitrogen; carbon monoxide-ethylene-oxygen-nitrogen; carbon monoxide-n-hexane-oxygen-nitrogen; methane-oxygen; methane-oxygen-nitrogen methane-nitrous oxide-nitrogen; acetylene-oxygen; acetylene-oxygen-argon; acetylene-oxygen-helium; acetylene-oxygen-krypton; acetylene-oxygen-nitrogen; ethylene-oxygen-nitrogen; ethylene-oxygen-argon; ethylene-oxygen-helium; ethane-oxygen-nitrogen; ethane-oxygen-argon; ethane-oxygen-helium; propane-oxygen-nitrogen; propane-oxygen-argon; propane-oxygen-helium; n-butane-oxygen; benzene-hydrogen-oxygen-nitrogen; n-hexane-nitrogen-oxygen; and n-hexane-acetylene-nitrogen-oxygen.

8. The method of claim 4 wherein flow throughout the microchannel is laminar.

9. The method of claim 4 wherein the microchannel has a length less than the detonation run-up length L*.

10. The method of claim 4 wherein the microchannel comprises a blockage ratio and an unobstructed passage distance, wherein the blockage ratio in the microchannel is between 0.3 and 0.6 and the unobstructed passage distance is no greater than 0.8 times the detonation cell size.

11. The method of claim 4 wherein the gas mixture comprises ethane and a stiochiometric amount of air, for complete combustion, at 1 atm and 298 K, and the channel gap is between 6 mm and 54 mm.

12. A chemical system, comprising
a microchannel reactor comprising a microchannel containing a detonable gas mixture flowing through the microchannel;
wherein the microchannel containing the detonatable gas mixture has a channel gap greater than a quench gap; and
further comprising a safening characteristic comprising at least one of:
(a) wherein the channel gap detonation cell size is smaller than a cell size required to allow a detonation;
or
(b) wherein the microchannel has a length less than a detonation run-up length L*; or
(c) maintaining flow in a laminar region, transitional region, or turbulent region at a velocity below Mach 1.0, throughout the microchannel.

13. The chemical system of claim 12 wherein the apparatus comprises plural layers, wherein at least two of said plural layers comprise at least one microchannel containing a detonable gas mixture and further comprising at least one of the safening characteristics of claim 13 in each of said at least one microchannel containing a detonable gas mixture.

14. The chemical system of claim 12 wherein the microchannel has a size greater than two times the quench gap.

15. The chemical system of claim 14 wherein the gas mixture comprises $H_2$ and $O_2$.

16. The chemical system of claim 14 wherein flow throughout the microchannel is laminar.

17. The chemical system of claim 14 wherein the microchannel has a length less than the detonation run-up length L*.

18. The method of claim 4 wherein flow throughout the microchannel is at a velocity below Mach 1.0.

19. The chemical system of claim 14 wherein the microchannel has a size of 0.5 cm or less.

20. The chemical system of claim 14 wherein the detonable gas mixture a partial pressure of methane of at least 0.5 atm.

21. The method of claim 6 wherein the detonable gas mixture comprises a molar proportion of 10% to 40% dihydrogen.

* * * * *